(12) United States Patent
Kaneko et al.

(10) Patent No.: US 7,414,748 B2
(45) Date of Patent: Aug. 19, 2008

(54) IMAGE INPUT/OUTPUT APPARATUS, METHOD OF CONTROLLING IMAGE INPUT/OUTPUT APPARATUS, IMAGE INPUT/OUTPUT SYSTEM, AND STORAGE MEDIA

(75) Inventors: Satoshi Kaneko, Kanagawa (JP); Hiroyuki Yaguchi, Kanagawa (JP)

(73) Assignee: Canon Kabushiki Kaisha (JP)

( * ) Notice: Subject to any disclaimer, the term of this patent is extended or adjusted under 35 U.S.C. 154(b) by 60 days.

(21) Appl. No.: 11/369,062

(22) Filed: Mar. 6, 2006

(65) Prior Publication Data

US 2006/0146367 A1   Jul. 6, 2006

Related U.S. Application Data

(62) Division of application No. 09/879,822, filed on Jun. 12, 2001, now Pat. No. 7,038,795.

(30) Foreign Application Priority Data

| Jun. 12, 2000 | (JP) | 2000-176125 |
| Jun. 13, 2000 | (JP) | 2001-177519 |
| May 30, 2001 | (JP) | 2001-162574 |
| May 31, 2001 | (JP) | 2001-164421 |

(51) Int. Cl.
*G06K 15/00* (2006.01)
*H04M 11/00* (2006.01)

(52) U.S. Cl. .............. 358/1.15; 379/100.01

(58) Field of Classification Search ............... 358/1.15, 358/400, 468, 443, 474, 1.2, 1.3, 1.9, 2.1, 358/1.12, 1.18, 1.16; 382/232, 250; 379/100.01
See application file for complete search history.

(56) References Cited

U.S. PATENT DOCUMENTS 5,481,336 A   1/1996   Tachibana et al.

(Continued)

FOREIGN PATENT DOCUMENTS

JP   03-083452 A   4/1991

(Continued)

OTHER PUBLICATIONS

Japanese Office Action issues in corresponding Japanese Patent Application No. 2001-162574, with mailing date Apr. 17, 2007.

*Primary Examiner*—J. Grant, II
(74) *Attorney, Agent, or Firm*—Rossi, Kimms & McDowell LLP

(57) ABSTRACT

To obtain image outputs which are equivalent to those obtained with local outputs even with regard to images received from an external device, there is provided an image input/output apparatus having an input section for inputting image data of original images, and an output section for outputting image data, and being connected to at least one other image input/output apparatus via a communication medium. A transmission section transmits the image data input by the input section and image accompanying information relating to the input image data to the other image input/output apparatus. A receiving receives image data and image accompanying information relating thereto from the other image input/output apparatus. An output control section carries out control so as to output images using the output section based on the image data and the image accompanying information received by the receiving section.

19 Claims, 26 Drawing Sheets

U.S. PATENT DOCUMENTS

| | | |
|---|---|---|
| 6,578,161 B1 | 6/2003 | Kohtani et al. |
| 2001/0012117 A1* | 8/2001 | Nakano ................. 358/1.14 |
| 2001/0022662 A1 | 9/2001 | Hosoda |
| 2001/0042234 A1 | 11/2001 | Sasaki et al. |
| 2001/0050779 A1* | 12/2001 | Jogo ..................... 358/1.9 |
| 2001/0051052 A1* | 12/2001 | Terao et al. ............. 399/16 |
| 2002/0044128 A1 | 4/2002 | Hayashi et al. |
| 2002/0090206 A1 | 7/2002 | Kikuchi et al. |

FOREIGN PATENT DOCUMENTS

| | | |
|---|---|---|
| JP | 07-321974 A | 12/1995 |
| JP | 09-116682 A | 5/1997 |
| JP | 10-65244 A | 4/1998 |
| JP | 11-284793 A | 10/1999 |

* cited by examiner

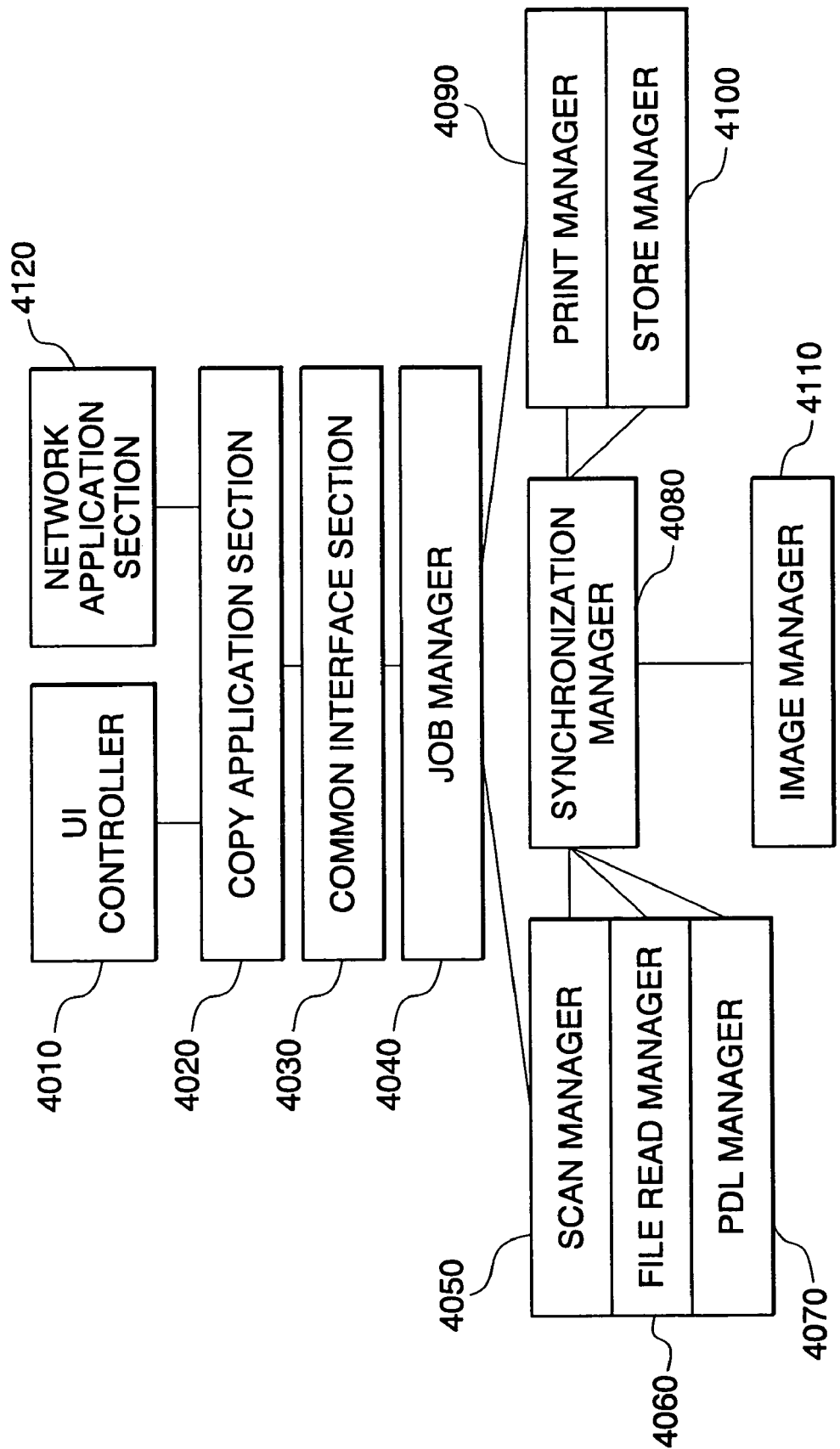

FIG. 17

| TAG NAME | SIZE | VALUE |
|---|---|---|
| SubFile Type | LONG | 1 |
| ImageWidth | SHORT | 7040 |
| ImageLength | SHORT | 4960 |
| BitsPerSample | SHORT | 1 |
| Compression | SHORT | 4 |
| Photometric | SHORT | 0 |
| FillOrder | SHORT | 1 |
| StripOffsets | LONG | 384 |
| Orientation | SHORT | 1 |
| SamplesPerPixel | SHORT | 1 |
| RowsPerStrip | LONG | 2338 |
| StripByteCounts | LONG | 25526 |
| Xresolution | RATIONAL | 600 |
| Yresolution | RATIONAL | 600 |
| PlanarConfig | SHORT | 1 |
| Group3Options | LONG | 0 |
| ResolutionUnit | SHORT | 2 |
| MarginTop(*1) | BYTE | 0 |
| MarginBtm(*1) | BYTE | 4 |
| MarginLft(*1) | BYTE | 0 |
| MarginRit(*1) | BYTE | 31 |
| ImageKind(*2) | LONG | 0 |
| MediaCode(*3) | LONG | 1 |
| Side(*4) | BYTE | 0 |
| WithoutZoomW(*1) | SHORT | 7015 |
| WithoutZoomL(*1) | SHORT | 4960 |

(*1) IN NUMBER OF PIXELS
(*2) 0:TEXT, 1:TEXT/PHOTO, 2:PHOTO
(*3) CODE FOR ORIGINAL SIZE
(*4) 0: ORIGINAL FRONT, 1: ORIGINAL BACK

ORIGINAL IMAGE

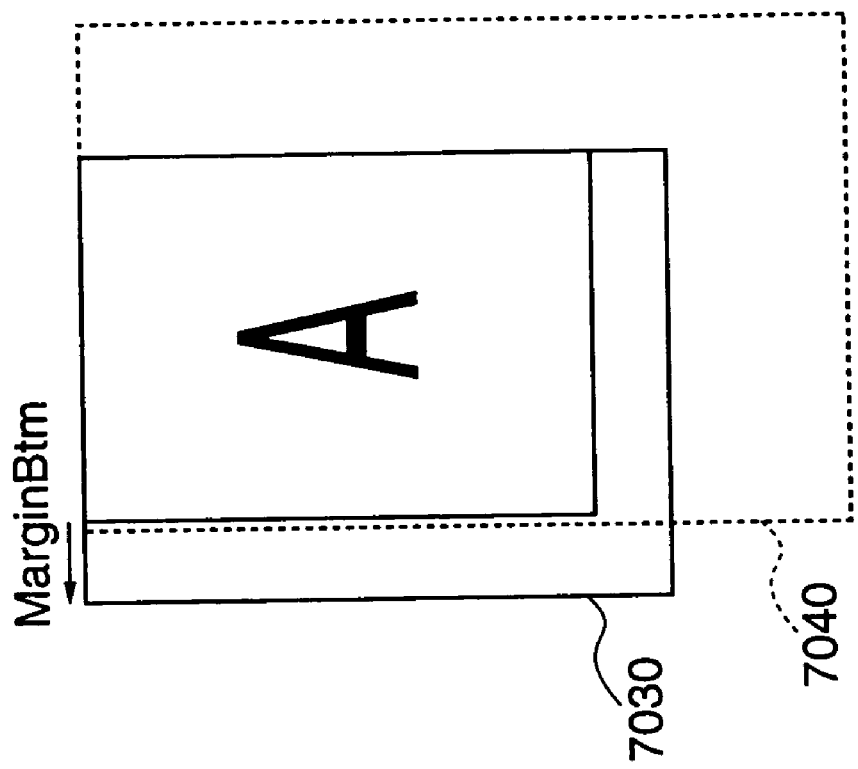
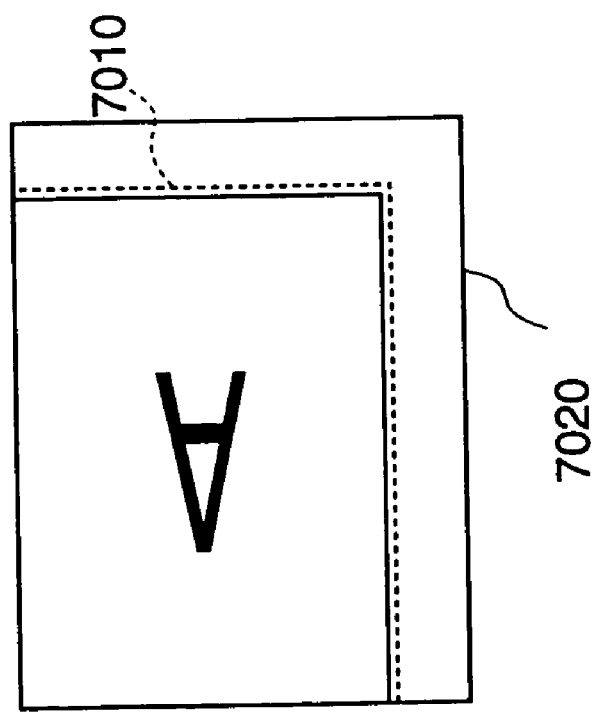
FIG. 19A
FIG. 19B

IMAGE INPUT/OUTPUT APPARATUS, METHOD OF CONTROLLING IMAGE INPUT/OUTPUT APPARATUS, IMAGE INPUT/OUTPUT SYSTEM, AND STORAGE MEDIA

This is a division of application Ser. No. 09/879,822, filed 12 Jun. 2001 now U.S. Pat. No. 7,038,795.

BACKGROUND OF THE INVENTION

1. Field of the Invention

The present invention relates to an image input/output apparatus, which are connected to other apparatuses via a communication medium, a method of controlling the image input/output apparatus, an image input/output system, and storage media storing programs for executing the above methods.

2. Description of the Related Art

Conventionally, image forming systems have been devised, including those (hereinafter referred to as "remote copying systems") comprised of an image input apparatus (for example, a scanner) and an image output apparatus (for example, a printer) connected to each other by a transmission medium such as a network via a controller unit, and those (hereinafter referred to as "cascade copying systems") comprised of a single image input apparatus and a plurality of image output apparatuses, in which the image input apparatus transmits images to the image output apparatuses in order to improve productivity.

Further, in recent years, the functions of image input/output apparatuses (for example, copying machines) have been significantly improved, and the remote copying systems and cascade copying systems are required to provide copying functions and performance equivalent to those of local copying provided by a single local image input/output apparatus.

Moreover, one of the image operation modes available is an automatic cassette selecting mode of selecting an optimum sheet size for image formation. This is an operation mode in which the size of an image input by an image input apparatus is detected, and, out of cassettes possessed by an image output apparatus, a cassette having sheets of the most suitable size set therein is selected automatically. By selecting the optimum sheet size using the automatic cassette selecting mode, the user can set the sheet size easily. When image formation is carried out in one of the above described conventional image forming systems using the automatic cassette selecting mode, the automatic cassette selection is executed by the image input apparatus by checking cassette information on a plurality of image output apparatuses.

Typically, when a single image input/output apparatus executes local copying, it transmits information (hereinafter referred to as "image-accompanying information") accompanying an image and obtained when an original was scanned, to a printer, which then controls printing based on this image-accompanying information. Such image-accompanying information includes, for example, the amount of white space (i.e. the margin sizes) provided at the top, bottom, left and right of the scanned image, the type of the original (for example, text or photograph), the size of the original, information for distinguishing the front of the original from the back, and the image size prior to correction in the case that the image size has been corrected by fine zooming adjustment.

However, although the remote copying systems or cascade copying systems are required to provide copying functions and performance equivalent to those of local apparatuses, the image output apparatus has insufficient image-accompanying information, so that output images obtained may not be so good as those obtained by local copying.

Moreover, when the image input apparatus carries out automatic cassette selection for a remote image output apparatus when carrying out image input, there is a need to collectively manage cassette information for a plurality of image output apparatuses on the image input apparatus side. Thus, when a cassette of one of the image output apparatuses has been changed, the user or apparatus has to perform troublesome operations such as changing the cassette information.

Further, when a cascade operation has been started but an error occurs because, for example, no sheet has been set in a cassette at a selected remote location which has been selected through the automatic cassette selecting operation, the user may have to change the cassette at the remote location, and then return to the image input apparatus to give a "restart" instruction, suspend image transmission, and execute other cumbersome processes required to eliminate the error. Consequently, the overall productivity decreases.

SUMMARY OF THE INVENTION

To solve the above problems, it is a first object of the present invention to provide an image input/output apparatus, a method of controlling the image input/output apparatus, an image input/output system, which are capable of obtaining image outputs which are equivalent to those obtained with local outputs even with regard to images received from an external device, and storage media storing programs for executing the above methods.

It is a second object of the present invention to provide an image input/output apparatus, a method of controlling the image input/output apparatus, an image input/output system, which are capable of obtaining printing outputs which are equivalent to those obtained with local outputs even with regard to images transmitted to an external device.

It is a third object of the present invention to provide an image input/output apparatus, a method of controlling the image input/output apparatus, an image input/output system, which are capable of obtaining image outputs which are equivalent to those obtained with local outputs even with regard to images received from an external device connected via a communication medium.

It is a fourth object of the present invention to provide an image input/output apparatus, a method of controlling the image input/output apparatus, an image input/output system, which are capable of obtaining image outputs which are equivalent to those obtained with local outputs even with regard to images transmitted to an external device, without increasing the load on the network.

It is a fifth object of the present invention to provide an image input/output apparatus, a method of controlling the image input/output apparatus, an image input/output system, which allow a remote apparatus to carry out cassette management and selection, thus eliminating the need for the local side to manage cassettes, and a storage medium storing a program for executing the above method.

It is a sixth object of the present invention to provide an image input/output apparatus, a method of controlling the image input/output apparatus, an image input/output system, which allow a remote apparatus to carry out cassette management and selection, thus enabling handling of cassette selection on the remote side even when a remote output error has occurred, and a storage medium storing a program for executing the above method.

To attain the above objects, in a first aspect of the present invention, there is provided an image input/output apparatus having input means for inputting image data of original images, and output means for outputting image data, the apparatus being connected to at least one other image input/output apparatus via a communication medium, comprising transmission means for transmitting the image data input by the input means and image accompanying information relating to the input image data to the at least one other image input/output apparatus, receiving means for receiving image data and image accompanying information relating thereto from the at least one other image input/output apparatus, and output control means for carrying out control so as to output images using the output means based on the image data and the image accompanying information received by the receiving means.

Typically, the image accompanying information is indicative of whether the image data corresponding to the image accompanying information is related to a front page of an original or to a back page of the original, and the output control means adjusts an output position of an image on a recording medium based on the image accompanying information.

In a typical preferred embodiment, the output means is a printer, and the output control means adjusts a printing position of an image on a printing sheet in the printer, based on the image accompanying information.

The image accompanying information may also be indicative of a type of original, and the output control means adjusts output quality of an image on a recording medium based on the image accompanying information.

In a preferred embodiment, the output means is a printer, and the output control means adjusts image quality of an image to be printed by the printer, based on the image accompanying information.

The image accompanying information may also be indicative of sizes of margins contained in the image data corresponding to the image accompanying information, and the output control means adjusts an output position of an image on a recording medium based on the image accompanying information.

In a preferred embodiment, the output means is a printer, and the output control means adjusts a printing position of an image on a printing sheet in the printer, based on the image accompanying information.

The image accompanying information may also be indicative of an image size before fine adjustment of image size is carried out, and the output control means carries out at least selection of a recording medium based on the image accompanying information.

In a preferred embodiment, the output means is a printer having a plurality of sheet feeding stages, and the output control means carries out selection of the sheet feeding stages, selection of a printing sheet and image rotation control based on the image accompanying information.

Typically, the input means is a scanner.

In a preferred embodiment, transmission means transmits the image accompanying information using a free area in a header of a TIFF file.

The above preferred forms of the first aspect also apply to the other aspects of the present invention given below.

To attain the above objects, the first aspect of the present invention further provides a method of controlling an image input/output apparatus having an input section that inputs image data of original images, and an output section that outputs image data, and being connected to at least one other image input/output apparatus via a communication medium, comprising a transmission step of transmitting the image data input by the input section and image accompanying information relating to the input image data to the at least one other image input/output apparatus, a receiving step of receiving image data and image accompanying information relating thereto from the at least one other image input/output apparatus, and an output control step of controlling so as to output images using the output section based on the image data and the image accompanying information received through the receiving step.

To attain the above objects, the first aspect of the present invention further provides an image input/output system in which a plurality of image input/output apparatuses each having input means for inputting image data of original images, and output means for outputting image data are connected together via a communication medium, comprising transmission means for transmitting the image data input by the input means and image accompanying information relating to the input image data to at least one of the image input/output apparatus, receiving means for receiving image data and image accompanying information relating thereto from at least one of the image input/output apparatus, and output control means for carrying out control so as to output images using the output means based on the image data and the image accompanying information received by the receiving means.

To attain the above objects, the first aspect of the present invention further provides a computer-readable storage medium storing a program code that implements a method of controlling an image input/output apparatus having an input section that inputs image data of original images, and an output section that outputs image data, and being connected to at least one other image input/output apparatus via a communication medium, the program code comprising a transmission code for transmitting image data input by the input section and image accompanying information relating to the input image data to the at least one other image input/output apparatus, a receiving code for receiving image data and image accompanying information relating thereto from the at least one other image input/output apparatus, and an output control code for controlling so as to output images using the output section based on the image data and the image accompanying information received through the receiving code.

To attain the above objects, a second aspect of the present invention provides: an image input/output apparatus connected to at least one printing apparatus via a communication medium, comprising input means for inputting image data of original images, and transmission means for transmitting image data to the at least one printing apparatus, wherein the transmission means transmits the image data of the original images and image accompanying information relating to the image data of the original images to the at least one printing apparatus; a method of controlling an image input/output apparatus having an input section that inputs original images, and being connected to at least one printing apparatus via a communication medium, comprising an input step of inputting image data of the original images using the input section, and a transmission step of transmitting image data to the at least one printing apparatus, wherein in the transmission step, the image data of the original images and image accompanying information relating to the image data of the original images is transmitted to the at least one printing apparatus; an image input/output system in which at least one printing apparatus and at least one image input/output apparatus are connected together via a communication medium, comprising input means for inputting image data of original images, and transmission means for transmitting image data to the at least one printing apparatus, wherein the transmission means transmits the image data of the original images and image accompanying information relating to the image data of the original images to the at least one printing apparatus; a computer-readable storage medium storing a program code that implements a method of controlling an image input/output apparatus having an input section that inputs original images and being connected to at least one printing apparatus via a communication medium, the program code comprising an input code for inputting image data of original images using the input section, and a transmission code for transmitting image data to the at least one printing apparatus, wherein the transmission code implements transmission of the image data of the original images and image accompanying information relating to the image data of the original images to the at least one printing apparatus; and a computer-readable storage medium storing a program code that, in an image input/output apparatus having a scanner section, a printer section, a memory section, an image processing section, and an operating section and being connected to at least one other image input/output apparatus via a network, implements a method of outputting, using the at least one other image input/output apparatus, image data input by the scanner section, the program code comprising a job controlling code for controlling a job generated based on copy setting information input by the operating section, a device controlling code for carrying out device control based on the job such that the scanner section inputs image data, the image processing section converts the input image data into a TIFF file, and the memory section stores the TIFF file, and a network controlling code for transmitting the TIFF file stored in the memory section to the at least one other image input/output apparatus, wherein, when conversion of the input image data into the TIFF file is carried out, the device controlling code implements attaching device controlling information and the copy setting information to a header of the TIFF file, and the network controlling code implements transmission of the TIFF file with the device controlling information and the copy setting information attached to the header thereof to the at least one other image input/output apparatus.

To attain the above objects, a third aspect of the present invention provides: an image input/output apparatus connected via a communication medium to at least one image reading apparatus that input image data of original images, comprising receiving means for receiving the image data of the original images from the at least one image reading apparatus, printing means for printing image data, and printing control means for controlling printing of the image data received by the receiving means, using the printing means, wherein the receiving means receives image accompanying information relating to the image data of the original images, and the printing control means controls the printing using the printing means based on the image data and the image accompanying information received by the receiving means; a method of controlling an image input/output apparatus having a printing section that prints image data, and being connected via a communication medium to at least one image reading apparatus that input image data of original images, comprising a receiving step of receiving the image data of the original images from the at least one image reading apparatus, a printing step of printing image data using the printing section, and a printing control step of controlling printing of image data received through the receiving step, using the printing step, wherein in the receiving step, image accompanying information relating to the image data of the original images is received, and in the printing control step, the printing using the printing section is controlled based on the image data and the image accompanying information received through the receiving step; an image input/output system in which at least one image reading apparatus that each input image data of original images and at least one image input/output apparatus are connected together via a communication medium, comprising receiving means for receiving the image data of the original images from the at least one image reading apparatus, printing means for printing image data using the at least one image output apparatus, and printing control means for controlling printing of the image data received by the receiving means, using the printing means, wherein the receiving means receives image accompanying information relating to the image data of the original images, and the printing control means controls the printing using the printing means based on the image data and the image accompanying information received by the receiving means; a computer-readable storage medium storing a program code that implements a method of controlling an image input/output apparatus having a printing section that prints image data and being connected via a communication medium to at least one image reading apparatus that inputs image data of original images, the program code comprising a receiving code for receiving the image data of the original images from the at least one image reading apparatus, a printing code for printing image data using the printing section, and a printing control code for controlling printing of image data received through the receiving code, using the printing code, wherein the receiving code implements reception of image accompanying information relating to the image data of the original images, and the printing control code implements control of the printing using the printing section based on the image data and the image accompanying information received through the receiving code; and a computer-readable storage medium storing a program code that, in an image input/output apparatus having a scanner section, a printer section, a memory section, an image processing section, and an operating section and being connected to at least one other image input/output apparatus via a network, implements a method of outputting, using the printer section, image data input by the at least one other image input/output apparatus, the program code comprising a network controlling code for receiving image data in TIFF file format from the at least one other image input/output apparatus, storing the received image data in the memory section, and issuing a job based on the received image data, a job controlling code for controlling the job issued through the network controlling code, and a device controlling code for carrying out device control based on the job such that the image processing section expands the stored image data in TIFF file format into image data before conversion into the TIFF file format, and the printer section outputs the expanded image data, wherein device controlling information and copy setting information from the at least one other image input/output apparatus is attached to a header of the TIFF file, and the device controlling code implements control such that the image data is outputted based on the device controlling information and the copy setting information from the at least one other image input/output apparatus.

To attain the above objects, a fourth aspect of the present invention provides: an image input/output apparatus connected to at least one image output apparatus via a communication medium, comprising converting means for converting input image data into a TIFF file, and transmission means for transmitting the TIFF file converted by the converting means to the at least one image output apparatus, wherein the transmission means attaches to a free area in a header of the TIFF file, control information for the at least one image output apparatus to carry out image output of the image data, and transmits the control information; a method of controlling an image input apparatus connected to at least one image output apparatus via a communication medium, comprising a converting step of converting input image data into a TIFF file, and a transmission step of transmitting the TIFF file converted through the converting step to the at least one image output apparatus, wherein in the transmission step, control information for the at least one image output apparatus to carry out image output of the image data is attached to a free area in a header of a TIFF file and transmitted; an image input/output system in which at least one image output apparatus and at least one image input/output apparatus are connected together via a communication medium, comprising converting means for converting image data input by the at least one image input apparatus into a TIFF file, and transmission means for transmitting the TIFF files converted by the converting means to the at least one image output apparatus, wherein the transmission means attaches to a free area in a header of the TIFF files, control information for the at least one image output apparatus to carry out image output of the image data, and transmits the control information; and a computer-readable storage medium storing a program code that implements a method of controlling an image input/output apparatus connected to at least one image output apparatus via a communication medium, the program code comprising a converting code for converting input image data into a TIFF file, and transmission code for transmitting the TIFF file converted through the converting code to the at least one image output apparatus, wherein the transmission code implements attaching control information for the at least one image output apparatus to carry out image output of the image data to a free area in a header of the TIFF file, and transmission of the control information.

To attain the above objects, a fifth aspect of the present invention provides an image input/output apparatus having output means for outputting image data, and being connected to at least one other image input/output apparatus via a communication medium, comprising management means for managing cassette information on sheet cassettes provided in the output means, and first selection means for selecting one of the sheet cassettes for outputting image data by the output means based on the cassette information managed by the management means, wherein, when image data received from the at least one other image input/output apparatus is to be outputted by the output means, the first selection means selects one of the sheet cassettes based on the cassette information; a method of controlling an image input/output apparatus having an output section that outputs image data, and being connected to at least one image input/output apparatus via a communication medium, comprising a management step of managing cassette information on sheet cassettes provided in the output section, and a first selection step of selecting one of the sheet cassettes for outputting image data by the output section based on the cassette information managed through the management step, wherein, when image data received from the at least one image input/output apparatus is to be outputted by the output section, in the first selection step, one of the sheet cassettes is selected based on the cassette information; an image input/output system in which a plurality of image input/output apparatuses having output means for outputting image data are connected together via a communication medium, at least one if the image input/output apparatus on sheet cassettes provided in the output means, and first selection means for selecting one of the sheet cassettes for outputting image data by the output means based on the cassette information managed by the management means, wherein, when image data received from the at least one other image input/output apparatus is to be outputted by the output means, the first selection means selects one of the sheet cassettes based on the cassette information.

To attain the above objects, a sixth aspect of the present invention provides an image input/output apparatus having output means for outputting image data, and being connected to at least other one image input/output apparatus via a communication medium, comprising management means for managing cassette information on sheet cassettes provided in the output means, and first selection means for selecting one of the sheet cassettes for outputting image data by the output means based on the cassette information managed by the management means, wherein, when image data received from the at least one other image input/output apparatus is to be outputted by the output means, the first selection means selects one of the sheet cassettes based on the cassette information; a method of controlling an image input/output apparatus having an output section that outputs image data, and being connected to at least one image input/output apparatus via a communication medium, comprising a management step of managing cassette information on sheet cassettes provided in the output section, and a first selection step of selecting one of the sheet cassettes for outputting image data by the output section based on the cassette information managed through the management step, wherein, when image data received from the at least one image input/output apparatus is to be outputted by the output section, in the first selection step, one of the sheet cassettes is selected based on the cassette information; an image input/output system in which a plurality of image input/output apparatus having output means for outputting image data are connected together via a communication medium, comprising at least one image input/output apparatus management means for managing cassette information on sheet cassettes provided in the output means, and first selection means for selecting one of the sheet cassettes for outputting image data by the output means based on the cassette information managed by the management means, wherein, when image data received from the at least one other image input/output apparatus is to be outputted by the output means, the first selection means selects one of the sheet cassettes based on the cassette information.

The above and other objects, features and advantages of the invention will become more apparent from the following detailed description taken in conjunction with the accompanying drawings.

BRIEF DESCRIPTION OF THE DRAWINGS

FIG. 16 is a view showing the construction of software for processes executed by the controller unit;

FIG. 17 is a view showing the construction of a TIFF header used in the present invention;

FIGS. 18A and 18B are views showing the locations of margins in a scanned image, in which:

FIG. 18A shows an original image; and

FIG. 18B shows a scanned image;

FIGS. 19A and 19B are views showing a printing process executed in the case where a "no sheet" status occurs during A4-sized image printing and a B4-sized sheet is then selected;

FIGS. 22A and 22B are views showing results of printing when the front and back sides of an original image are copied in a remote copy mode, in which:

FIG. 22A shows the front side of the original image; and

FIG. 22B shows the back side thereof;

DETAILED DESCRIPTION OF PREFERRED EMBODIMENTS

The present invention will be described below with reference to the drawings showing preferred embodiments thereof.

First Embodiment

Figure 1:
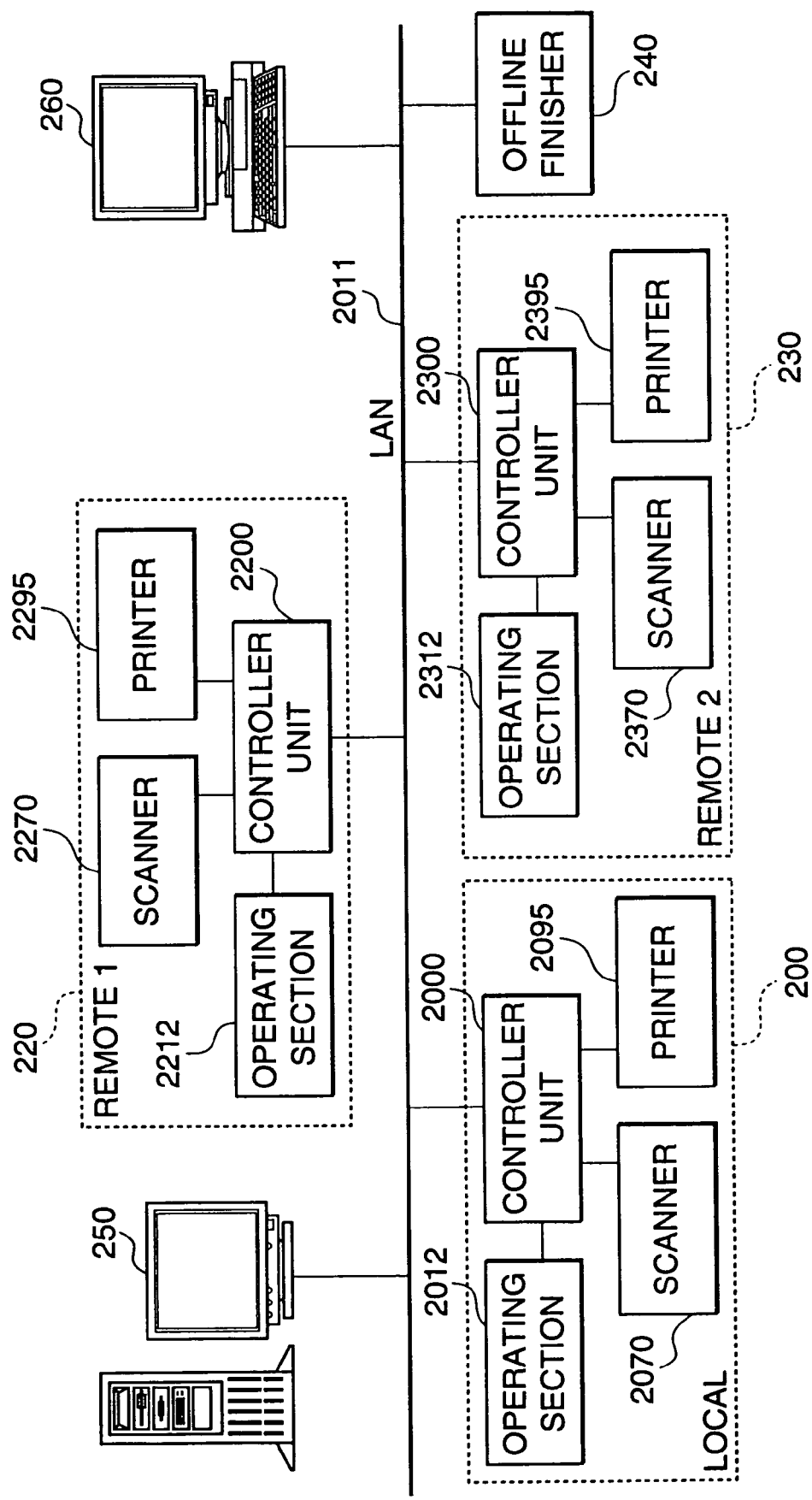
FIG. 1 is a block diagram showing the construction of an entire system including a plurality of image input/output apparatuses according to the present invention.

FIG. 1 is a view showing the construction of an image forming system to which the present invention is applicable.

An image input/output apparatus 200 is comprised of a scanner 2070 as an image input device, a printer 2095 as an image output device, a controller unit 2000, and an operating section 2012 as a user interface. The scanner 2070, the printer 2095, and the operating section 2012 are each connected to the controller unit 2000. The controller unit 2000 is connected to a LAN 2011 as network transmitting means. Further, other image input/output apparatuses 220, 230 having an equipmental construction similar to that of the image input/output apparatus 200 are also connected to the LAN 2011. The image input/output apparatus 220 has a scanner 2270, a printer 2295, and an operating section 2212, which are each connected to a controller unit 2200. The image input/output apparatus 230 has a scanner 2370, a printer 2395, and an operating section 2312, which are each connected to a controller unit 2300. An offline finisher 240 carries out post-processing of printed sheets offline. A server computer 250 has a large capacity storage. A personal computer 260 is suitable for an individual user.

It should be noted that if, for example, reading in of an image (image input) is carried out using the scanner 2070 and printing (image output) is carried out using the printer 2095, that is, both the reading in and the printing are carried out within the image input/output apparatus 200, then this is referred to as 'local copying'; the same applies to the image input/output apparatuses 220, 230. However, if, for example, reading in of an image (image input) is carried out using the scanner 2070 of the image input/output apparatus 200 but printing (image output) is carried out using the printer 2295 of the image input/output apparatus 220 or the printer 2395 of the image input/output apparatus 230, then this is referred to as 'remote copying'. Moreover, if, for example, reading in of an image (image input) is carried out using the scanner 2070 of the image input/output apparatus 200 and printing (image output) is carried out using both the printer 2295 of the image input/output apparatus 220 and the printer 2395 of the image input/output apparatus 230, then this is referred to as 'cascade copying'.

A description will now be given of a case in which reading in of an image (image input) is carried out using the scanner 2070 of the image input/output apparatus 200 and this image data is transmitted to the printer of one of the other image input/output apparatuses, and moreover printing (image output) is carried out using the printer 2095 of the image input/output apparatus 200 based on image data transmitted from the scanner of one of the other image input/output apparatuses.

Figure 2:
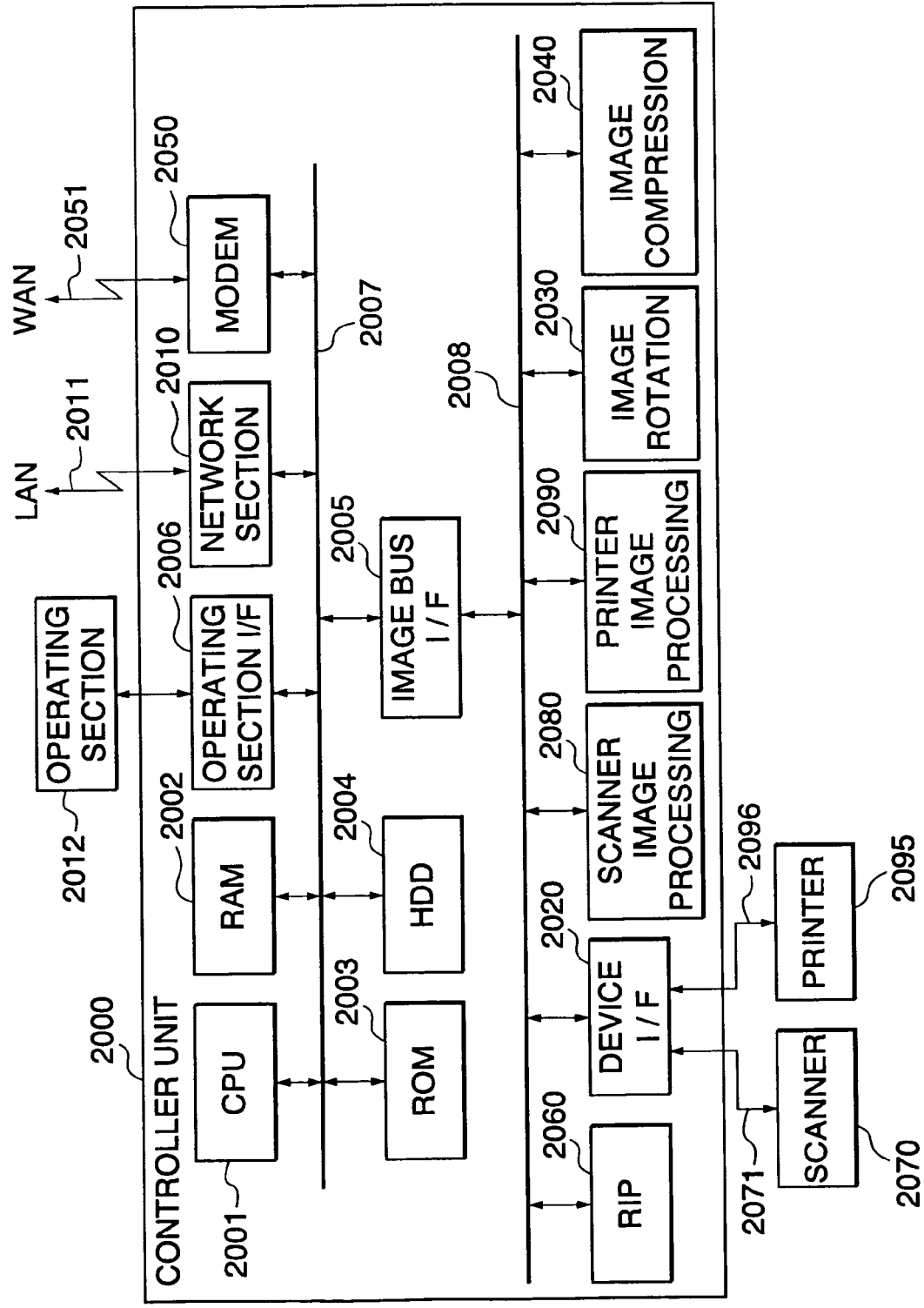
FIG. 2 is a block diagram showing the internal construction of a controller unit of an image input/output apparatus.

FIG. 2 is a block diagram showing the internal construction of the controller unit 2000 of the image input/output apparatus 200.

The controller unit 2000 is connected to the scanner 2070 as an image input device via a bus 2071, and is connected to the printer 2095 as an image output device via a bus 2096. On the other hand, the controller unit 2000 is connected to the LAN 2011 and a public line 2051 (WAN) to control the input and output of image information and device information.

A CPU 2001 is a controller that controls the entire system. A RAM 2002 is a system work memory for operation of the CPU 2001, and also acts as an image memory that temporarily stores image data. A ROM 2003 acts as a boot ROM that stores a system boot program. An HDD 2004 is a hard disk drive that stores system software and image data.

An operating section interface 2006 acts as an interface with the operating section 2012, and outputs image data to be displayed on the operating section 2012 to the operating section 2012. Moreover, the operating section interface 2006 also serves to communicate to the CPU 2001 information that a user of the present system inputs from the operating section 2012. A network interfacing section 2010 is connected to the LAN 2011 to carry out input and output of information. A modem 2050 is connected to the public line 2051 to carry out input and output of information. The above devices are arranged on a system bus 2007.

An image bus interface 2005 connects between the system bus 2007 and an image bus 2008 that transfers image data at a high speed, and acts as a bus bridge that converts data structures. The image bus 2008 is a PCI bus or a bus stipulated by the IEEE 1394.

Devices arranged on the image bus 2008 will be described. A raster image processor (RIP) 2060 expands a PDL code into bit map images. A device interface section 2020 connects the scanner 2070 and the printer 2095 to the controller unit 2000 to carry out synchronous/asynchronous conversion of image data. A scanner image processing section 2080 carries out correction, processing and editing on input image data. A printer image processing section 2090 carries out correction, resolution conversion, or the like on print output image data so as to make the data suitable for the printer 2095. An image rotating section 2030 rotates image data. An image compressing section 2040 carries out JPEG compression/decompression processes on multivalued image data, and also carries out JBIG, MMR, and MH compression/decompression processes on binary image data.

In the HDD 2004, information such as image output speeds and installation locations relating to nodes connected to the network (LAN 2011), which were checked upon the start of the apparatus, is stored for each address.

Figure 3:
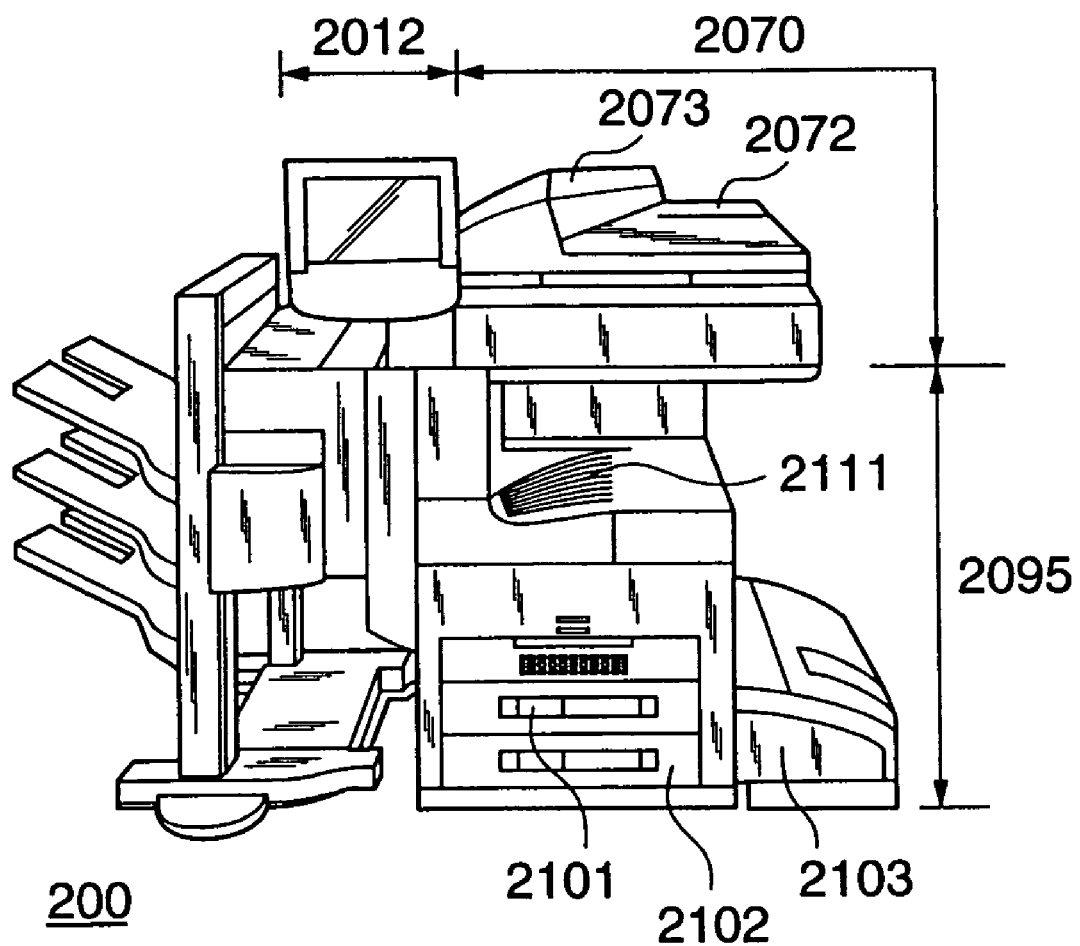
FIG. 3 is a view showing the construction of an image input/output apparatus as viewed from the outside.

FIG. 3 is a view showing the construction of the image input/output apparatus 200 as viewed from the outside.

The scanner 2070 as an image input device illuminates an image on a sheet as an original, scans the image with a CCD line sensor, not shown, to convert it into an electrical signal as raster image data, and then transmits this electrical signal to the controller unit 2000 via the bus 2071. Original sheets are set in a tray 2073 of an original feeder 2072, and when the user gives, from the operating section 2012, an instruction for starting a reading operation, the CPU 2001 of the controller unit 2000 gives an instruction to the scanner 2070 via the bus 2071. Then, the feeder 2072 feeds the original sheets sheet by sheet, while the scanner 2070 reads images from the originals.

The printer 2095 as an image output device is a section for converting raster image data received from the controller unit 2000 via the bus 2096 into images on sheets. Methods for carrying out the above conversion include an electrophotographic method that uses a photosensitive drum or a photosensitive belt, and an inkjet method of printing images directly on sheets by ejecting ink from an array of fine nozzles, but any method may be used. Actuation of the printing operation is carried out by means of an instruction transmitted from the CPU 2001 of the controller unit 2000 via the bus 2096. The printer 2095 has a plurality of sheet feeding stages so that sheets of different sizes or orientations can be selected, and has sheet cassettes 2101, 2102 and 2103 corresponding to these stages. Moreover, a sheet ejection tray 2111 is a section for receiving sheets that have been printed. Note that recording media housed in the sheet cassettes 2101, 2102 and 2103 are not limited to printing sheets but may be OHP sheets and other types of sheets.

Figure 4:
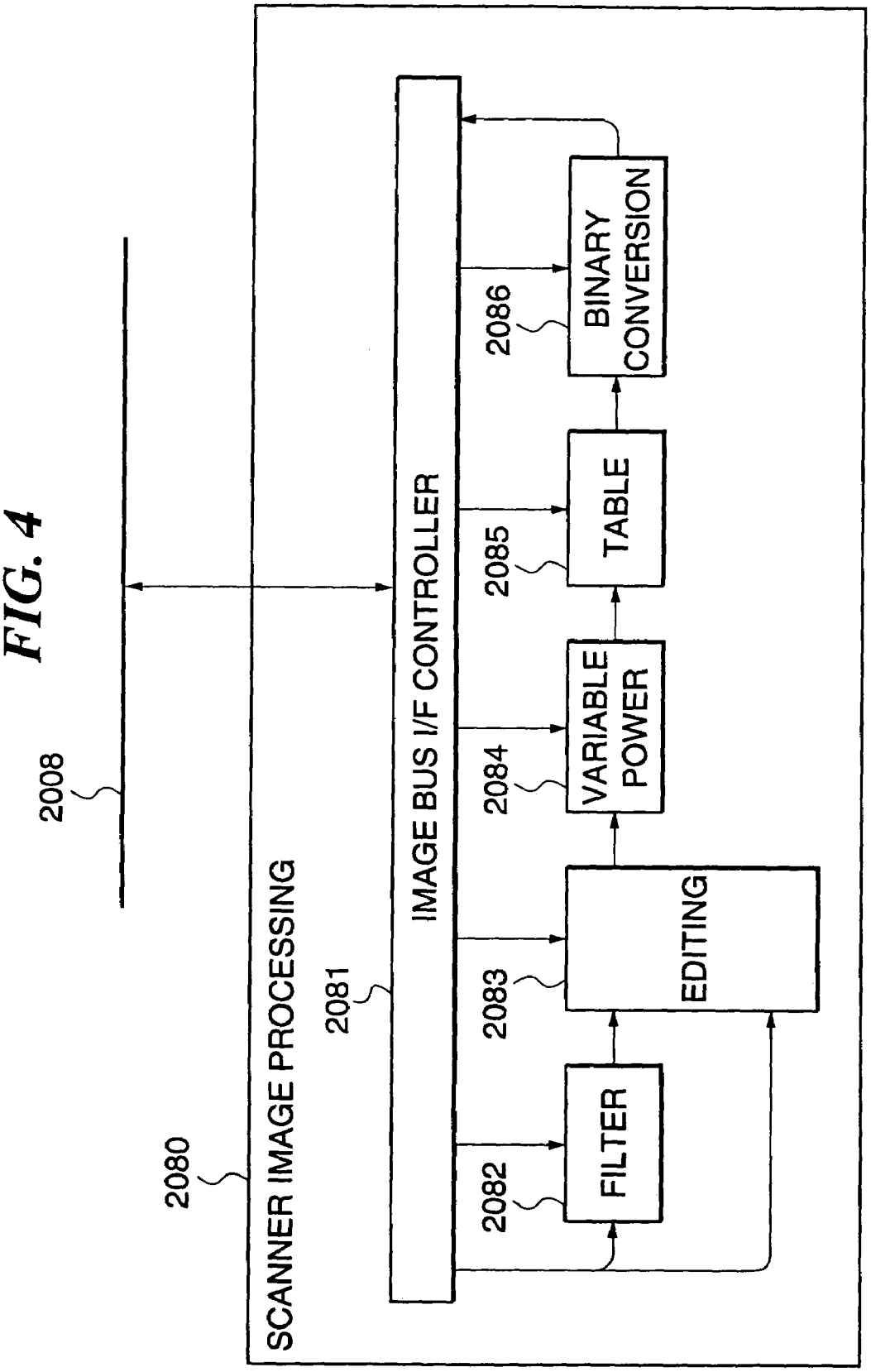
FIG. 4 is a view showing the construction of a scanner image processing section 2080.

The construction of the scanner image processing section 2080 will now be described with reference to a block diagram shown in FIG. 4. An image bus interface controller 2081 is connected to the image bus 2008 to control a bus access sequence thereof, and also controls each of the devices in the scanner image processing section 2080 and generates timing therefor. A filter processing section 2082 carries out convolution calculations using a spatial filter. An editing section 2083, for example, recognizes a closed region in input image data which is enclosed using a marker pen, and executes image processing such as shadowing, half-tone dot meshing, or negative/positive reversal on the image data in this closed region.

To change the resolution of a read image, a variable power processing section 2084 increases or reduces the size of the raster image in its main scanning direction by means of an interpolation calculation, while changing the size of the image in its sub-scanning direction by changing the scanning speed of the image reading line sensor, not shown.

A table 2085 is used for table conversion for converting the image data, that is, the read brightness data, into density data. A binary converting section 2086 converts the multivalued gray scale image into binary data by means of an error diffusion process or a screen process. The processed image data is transferred back onto the image bus 2008 via the image bus interface controller 2081.

Figure 5:
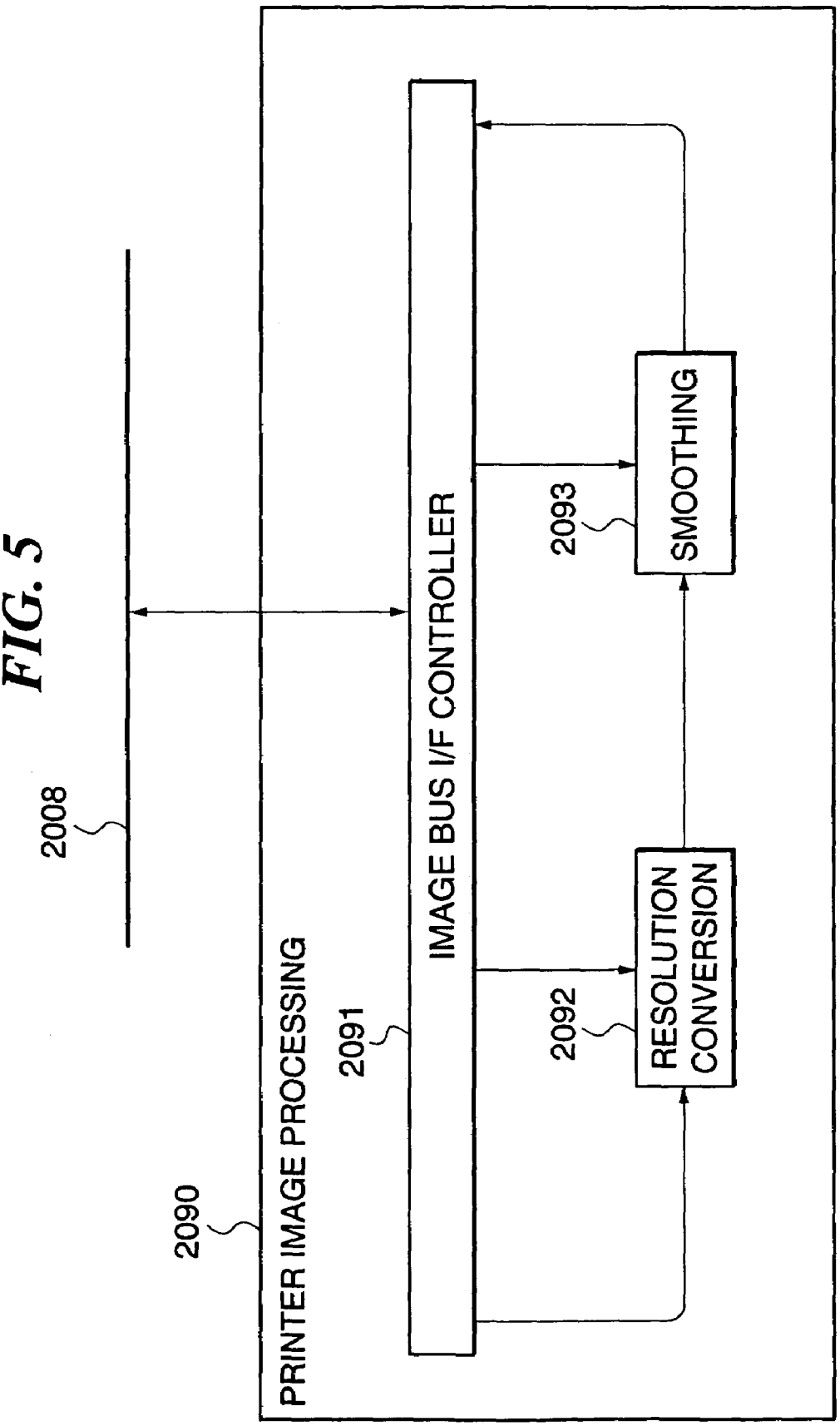
FIG. 5 is a view showing the construction of a printer image processing section 2090.

The construction of the printer image processing section 2090 will now be described using a block diagram shown in FIG. 5. An image bus interface controller 2091 is connected to the image bus 2008 to control a bus access sequence thereof, and also controls each of the devices in the printer image processing section 2090 and generates timing therefor.

A resolution conversion section 2092 converts image data transmitted via the LAN 2011 or the public line 2051 into data of a resolution suitable for the printer 2095. A smoothing processing section 2093 executes a process of smoothing jaggy parts (i.e. jagged parts of the image such as diagonal lines which appear at black/white boundaries) of the image data that has been subjected to the resolution conversion.

Figure 6:
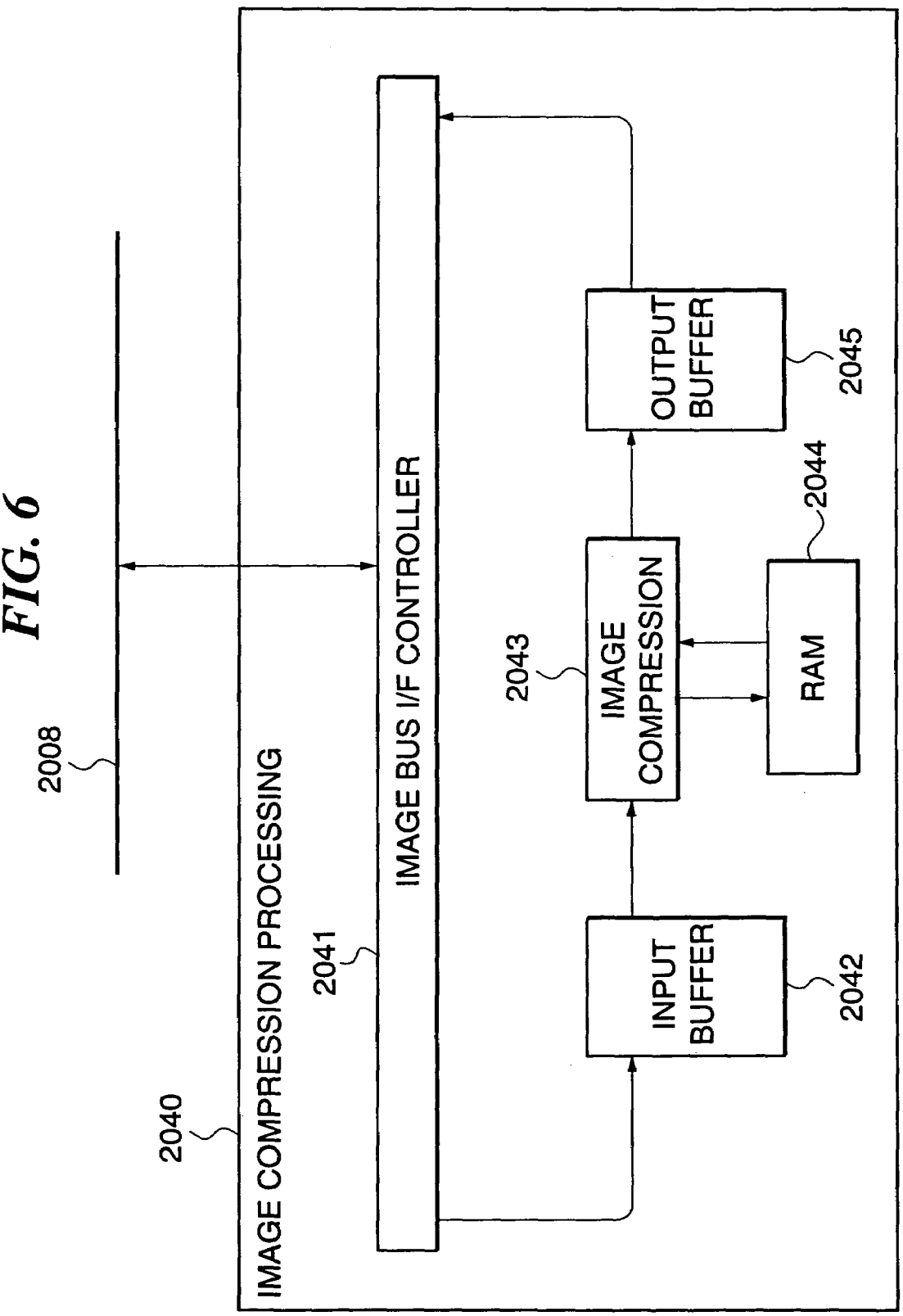
FIG. 6 is a block diagram showing the construction of an image compressing section 2040.

The construction of the image compressing section 2040 will now be described with reference to a block diagram shown in FIG. 6. An image bus interface controller 2041 is connected to the image bus 2008 to control a bus access sequence thereof, and provides such control as timing control required to exchange data with an input buffer 2042 and an output buffer 2045, and mode setting for an image compressing section 2043.

The CPU 2001 carries out setting of the image bus interface controller 2041 for image compression control via the image bus 2008. Based on this setting, the image bus interface controller 2041 carries out settings of the image compressing section 2043 required for the image compression (for example, MMR compression or JBIG decompression). After the required settings have been made, the CPU 2001 again permits the image bus interface controller 2041 to transfer image data. In accordance with this permission, the image bus interface controller 2041 starts transferring image data from the RAM 2002 or the devices on the image bus 2008.

The received image data are temporarily stored in the input buffer 2042, and in response to image data requests from the image compressing section 2043, the images are transferred at a fixed speed.

At this time, the input buffer 2042 determines whether or not the image data can be transferred between the image bus interface controller 2041 and the image compressing section 2043. When it is impossible to read in image data from the image bus 2008 or write images to the image compressing section 2043, the input buffer 2042 provides such control that data is not transferred (such control will hereinafter be referred to as "handshaking").

The image compressing section 2043 temporarily stores the received image data in a RAM 2044. This is because several lines of data may be required depending on the type of image compression processing, so that the first line of image data cannot be compressed before several lines of image data have been provided.

The image data that have been subjected to image compression is immediately transmitted to the output buffer 2045. The output buffer 2045 executes handshaking with the image bus interface controller 2041 and the image compressing section 2043, and then transfers the image data to the image bus interface controller 2041. The image bus interface controller 2041 transfers the transferred compressed (or decompressed) image data to the RAM 2002 or the devices on the image bus 2008.

This sequence of processing is repeated until the CPU 2001 stops issuing processing requests (until a required number of pages have all been processed) or until the image compressing section 2043 issues a stop request (when, for example, an error has occurred during compression or decompression).

Figure 7:
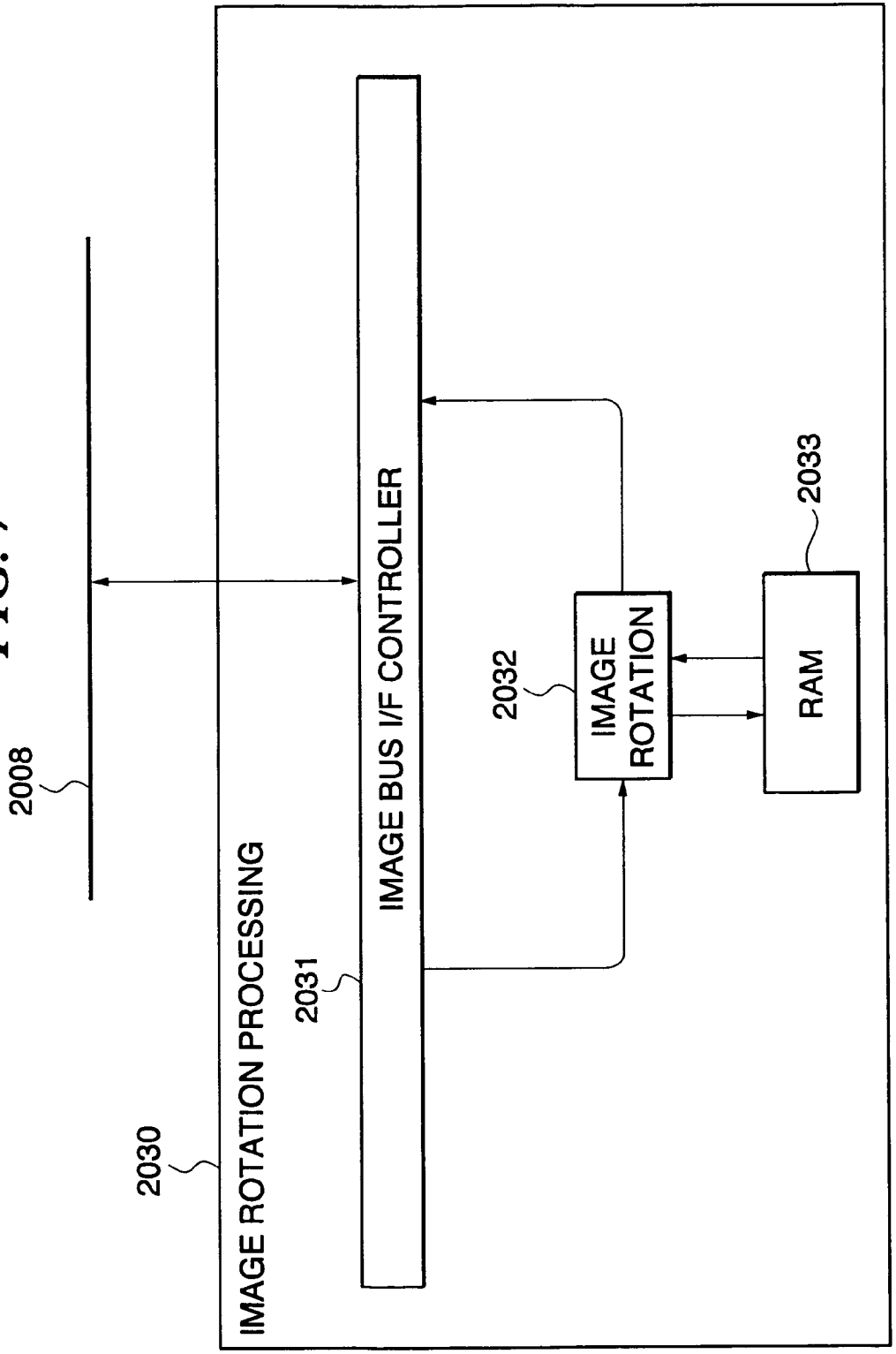
FIG. 7 is a view showing the construction of an image rotating section 2030.

The construction of the image rotating section 2030 will now be described with reference to a block diagram shown in FIG. 7. An image bus interface controller 2031 is connected to the image bus 2008 to control a bus access sequence thereof, and also controls setting of a mode or the like for an image rotating section 2032, and carries out control of timing for transferring image data to the image rotating section 2032.

The CPU 2001 carries out setting of the image bus interface controller 2031 for image rotation control via the image bus 2008. In accordance with this setting, the image bus interface controller 2031 carries out setting of the image rotating section 2032 necessary for the image rotation (for example, the image size, the direction and angle of rotation, etc.).

After the required settings have been made, the CPU 2001 again permits the image bus interface controller 2031 to transfer image data. In accordance with this permission, the image bus interface controller 2031 starts transfer of image data from the RAM 2002 or the devices on the image bus 2008. In the present embodiment, the image data is represented by 32 bits, the image to be rotated has a size of 32×32 bits, and when the image data is transferred onto the image bus 2008, the image transfer is carried out in units of 32 bits. Moreover, it is assumed that the images handled are binary images.

Figure 8:
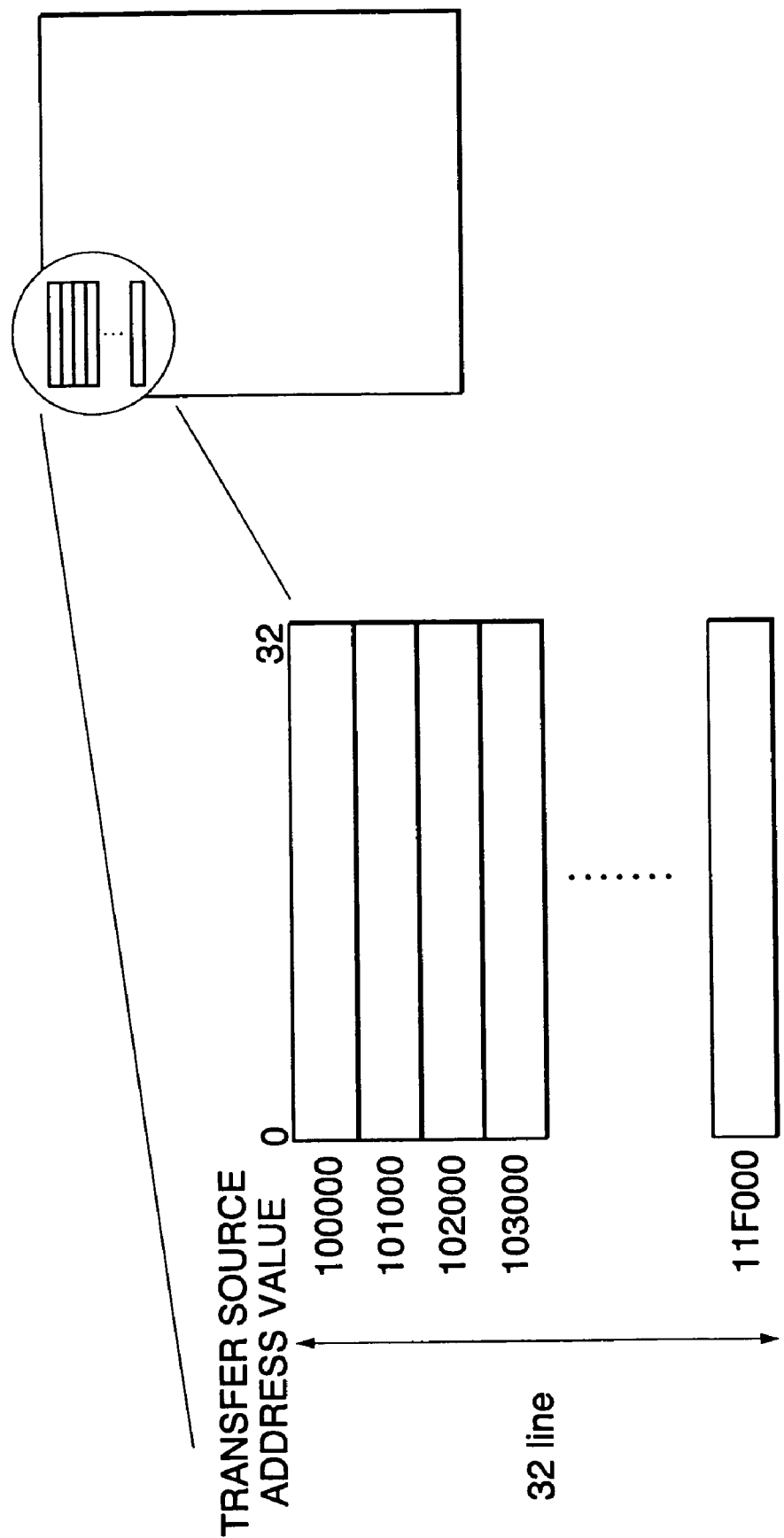
FIG. 8 is a view showing the addresses of image data at a transfer source.
Figure 9:
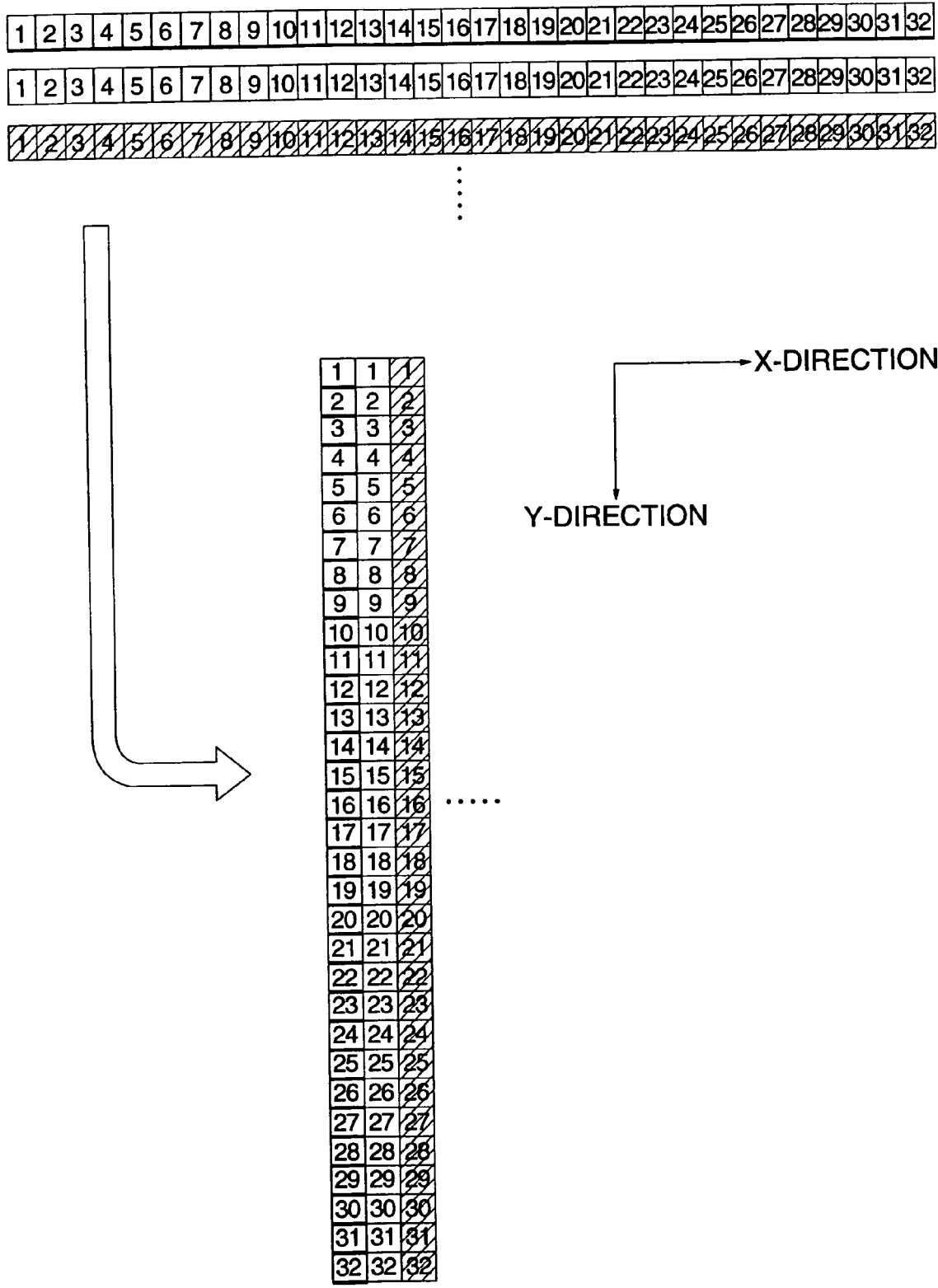
FIG. 9 is a view showing directions in which image data are written and read out.

As a result, to obtain a 32×32-bit image, the data transfer with the above units must be carried out 32 times, and moreover it is necessary to transfer image data from discontinuous addresses. FIG. 8 is a view showing the addresses of the image data at the transfer source. The image data that has been transferred by discontinuous addressing is written into a RAM 2033 such that it is rotated at a desired angle when read out. For example, in the case of anticlockwise rotation through 90 degrees, the 32 bits of image data transferred first are written in the Y-direction as shown in FIG. 9. By reading in the X-direction, the image is rotated. FIG. 9 is a view showing the directions in which the image data are written and read out.

After the 32×32 bit image has been completely rotated (or written into the RAM 2033), the image rotating section 2032 reads our the image data from the RAM 2033 using the readout method described above, and transfers the image to the image bus interface controller 2031.

Upon receiving the image data that has been subjected to rotation processing, the image bus interface controller 2031 transfers the data to the RAM 2002 or the devices on the image bus 2008 using continuous addressing. This sequence of processing is repeated until the CPU 2001 stops issuing processing requests (until a required number of pages have all been processed).

Figure 10:
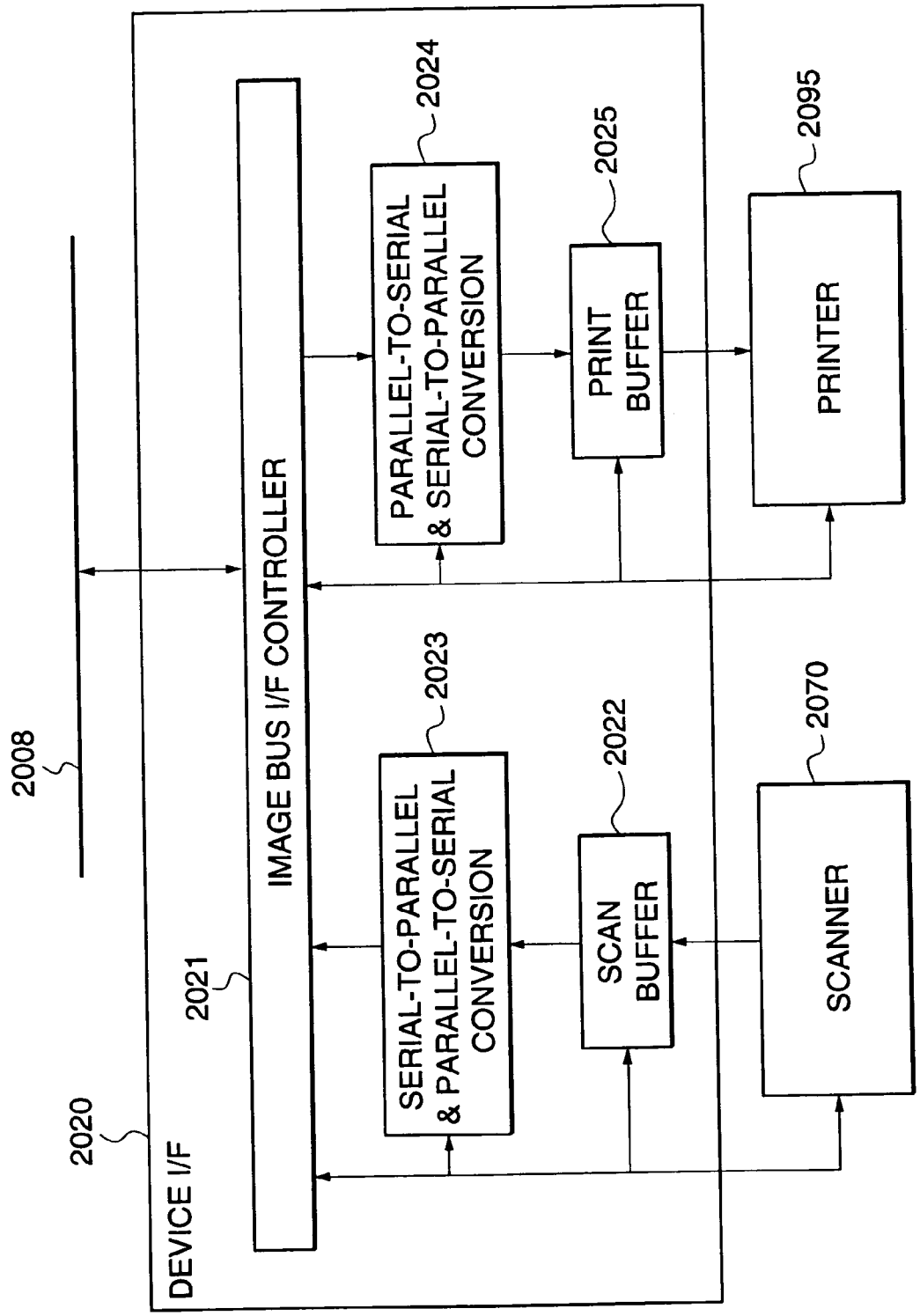
FIG. 10 is a view showing the construction of a device interface section 2020.

The construction of the device interface section 2020 will now be described with reference to a block diagram shown in FIG. 10. An image bus interface controller 2021 is connected to the image bus 2008 to control a bus access sequence thereof, and also controls each of the devices in the device interface section 2020 and generates timing therefor. Moreover, the image bus interface controller 2021 also generates control signals sent to an external scanner 2070 and the printer 2095.

A scan buffer 2002 temporarily stores image data transmitted from the scanner 2070, and outputs the image data onto the image bus 2008 in synchronism therewith. A serial-to-parallel and parallel-to-serial converting section 2023 arranges the image data stored in the scan buffer 2022, in a predetermined order, or disintegrate the image data to convert the image data into data of a data width that is suitable for transfer to the image bus 2008. A parallel-to-serial and serial-to-parallel converting section 2024 disintegrates the image data transferred from the image bus 2008 or arranges the data to convert the data into data of a data width suitable for saving in a print buffer 2025. The print buffer 2025 temporarily saves the image data transmitted from the image bus 2008, and outputs the data to the printer 2095 in synchronism therewith.

During image scanning, the image data transmitted from the scanner 2070 is saved in the scan buffer 2022 in synchronism with the timing signal transmitted from the scanner 100.

If the image bus 2008 is a PCI bus, when 32 bits or more of image data have been stored in the scan buffer 2022, 32 bits of image data are transmitted from the scan buffer 2022 to the serial-to-parallel and parallel-to-serial converting section 2023 in a first-in first-out manner. The serial-to-parallel and parallel-to-serial converting section 2023 converts the 32-bit data into 32 bits of image data, which is then transferred onto the image bus 2008 through the image bus interface controller 2021.

On the other hand, if the image bus 2008 is an IEEE1394 bus, the image data from the scab buffer 2022 is transmitted in a first-in first-out manner to the serial-to-parallel and parallel-to-serial converting section 2023, which then converts the data into serial image data, which is transferred onto the image bus 2008 via the image bus interface controller 2021.

During image printing, if the image bus 2008 is a PCI bus, the image bus interface controller 2021 receives the 32-bit image data from the image bus, and then transmits the same to the parallel-to-serial and serial-to-parallel converting section 2024, which then disintegrates the data into a number of bits of image data suitable for input to the printer 2095 and saves them in the print buffer 2025.

On the other hand, if the image bus is an IEEE 1394 bus, the image bus interface controller 2021 receives the serial image data from the image bus and then transmits the same to the parallel-to-serial and serial-to-parallel converting section 2024, which then converts the data into a number of bits of image data suitable for input to the printer 2095 and saves the same in the print buffer 2025. Then, the image data in the print buffer 2055 is transmitted to the printer 2095 in a first-in first-out manner synchronously with the timing signal transmitted from the printer 2095.

Figure 11:
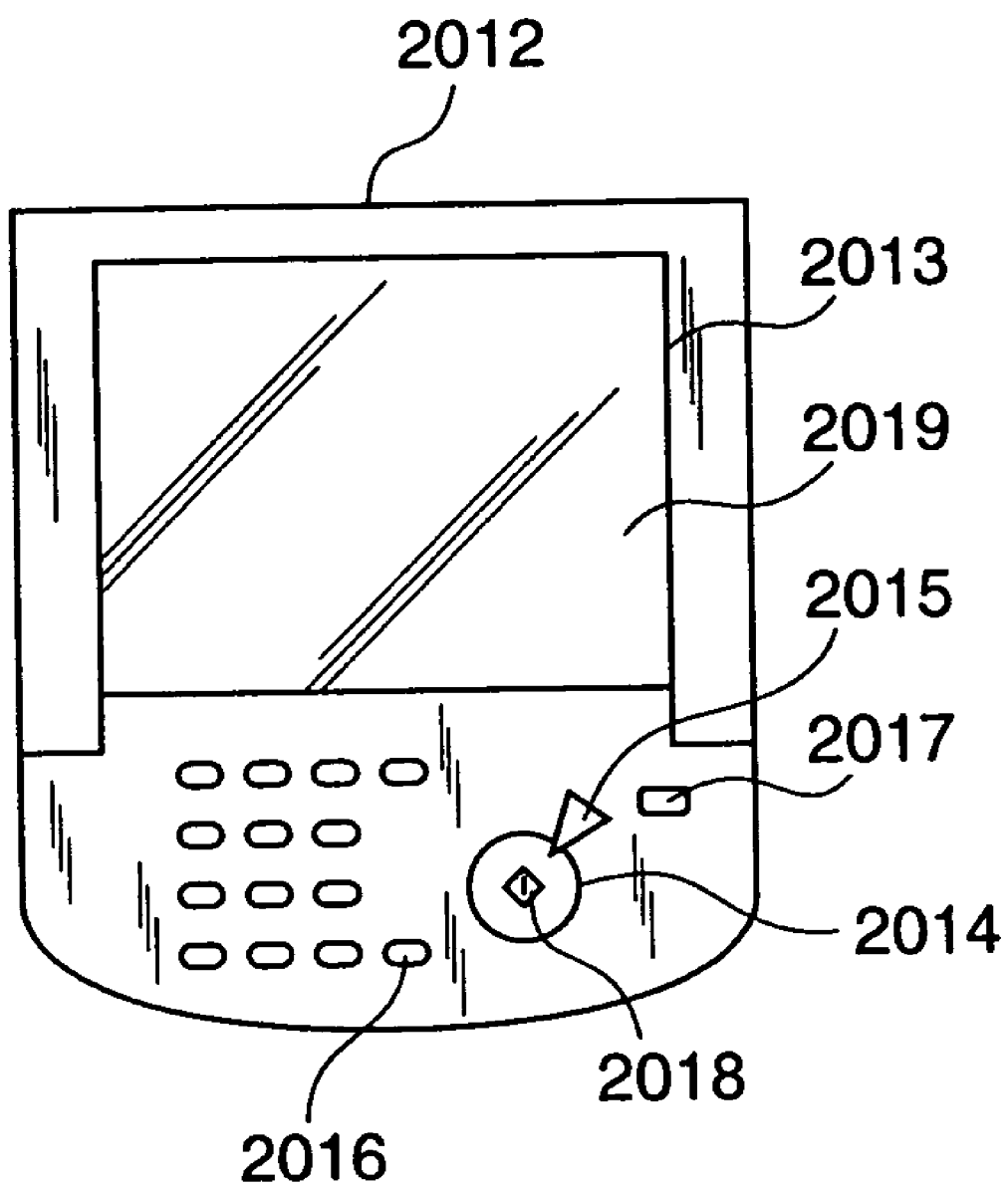
FIG. 11 is a view showing the construction of an operating section.

FIG. 11 is a schematic view showing the construction of the operating section 2012. A LCD display section 2013 is comprised of an LCD having a touch panel sheet 2019 stuck thereto. The LCD display section 2013 displays a system operation screen and soft keys, and when any of the displayed keys is depressed, it transmits information corresponding to the location of that key to the CPU 2001 of the controller unit 2000. A start key 2014 is used to start an operation of reading images from originals. The start key 2014 has a two-color LED 2018 provided in a central portion thereof and which is lighted green or red to indicate whether or not the start key 2014 is available. A stop key 2015 serves to stop an operation in progress. An ID key 2016 is used to input a user ID. A reset key 2017 is used to initialize settings from the operating section 2012.

Figure 12:
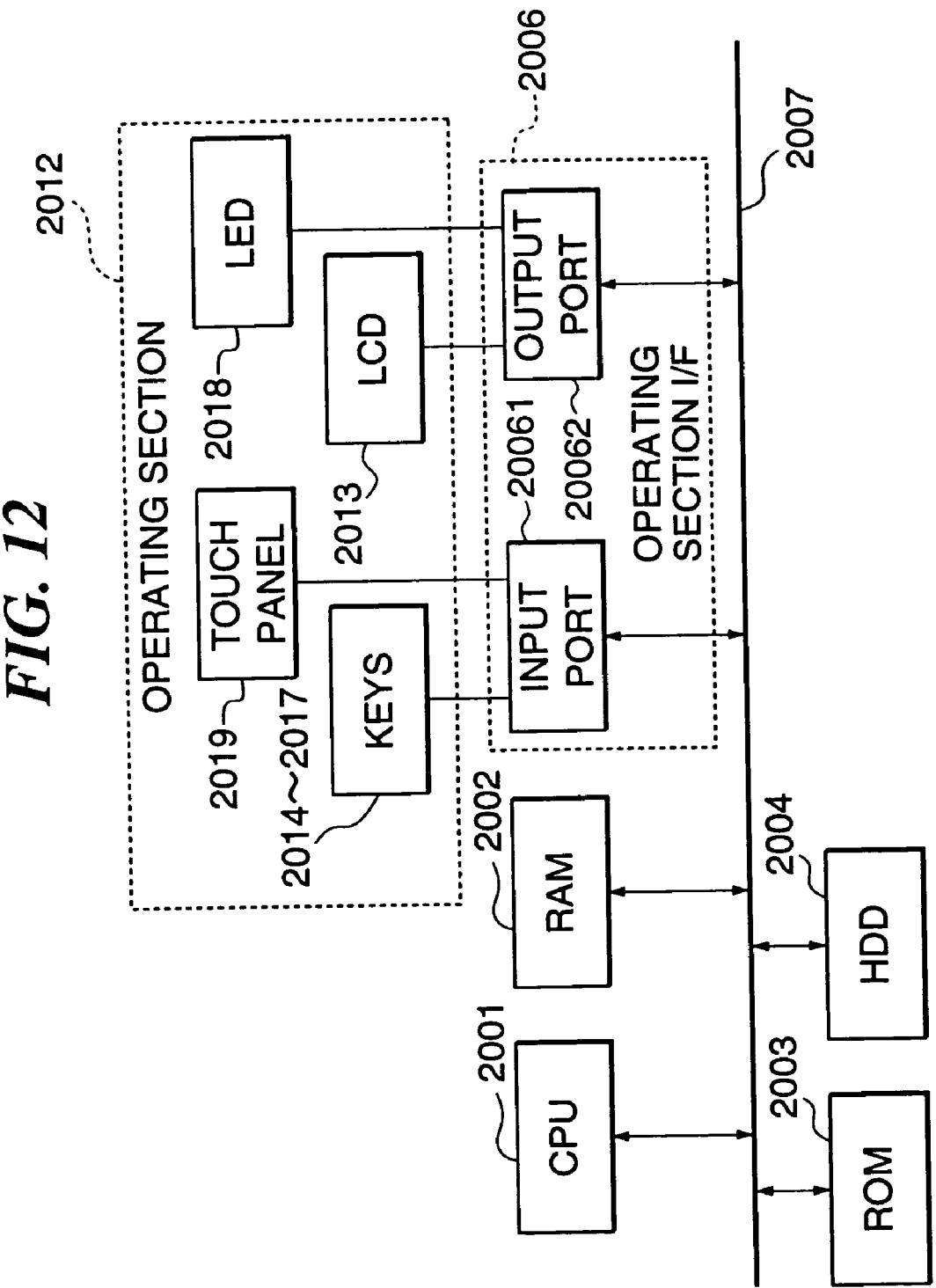
FIG. 12 is a block diagram showing the internal construction of the operating section and an operating section interface.

FIG. 12 is a block diagram showing the internal construction of the operating section 2012 and the operating section interface 2006. As described above, the CPU 2001 comprehensively controls access to various devices connected to the system bus 2007 based on a control program and others stored in the program ROM 2003, and reads in input information from the scanner 2070 via the device interface 2020, and outputs an image signal as output information to the printer 2095 via the device interface 2022, as shown in FIG. 2.

The CPU 2001 receives a user input signal input from a touch panel 2019 or any of the hard keys 2014 to 2017 via an input port 20061 of the operating section interface 2006, to obtain the contents of the operation. The CPU 2001 then generates display screen data based on the obtained contents of the operation and the above described control program in the ROM 2003, and outputs a display screen to the LCD display section 2013 via an output port 20062 of the operating section interface 2006 that controls the screen output device.

The operation of the image input/output apparatus 200 will now be described with reference to a screen displayed on the LCD display section 2013.

Figure 13:
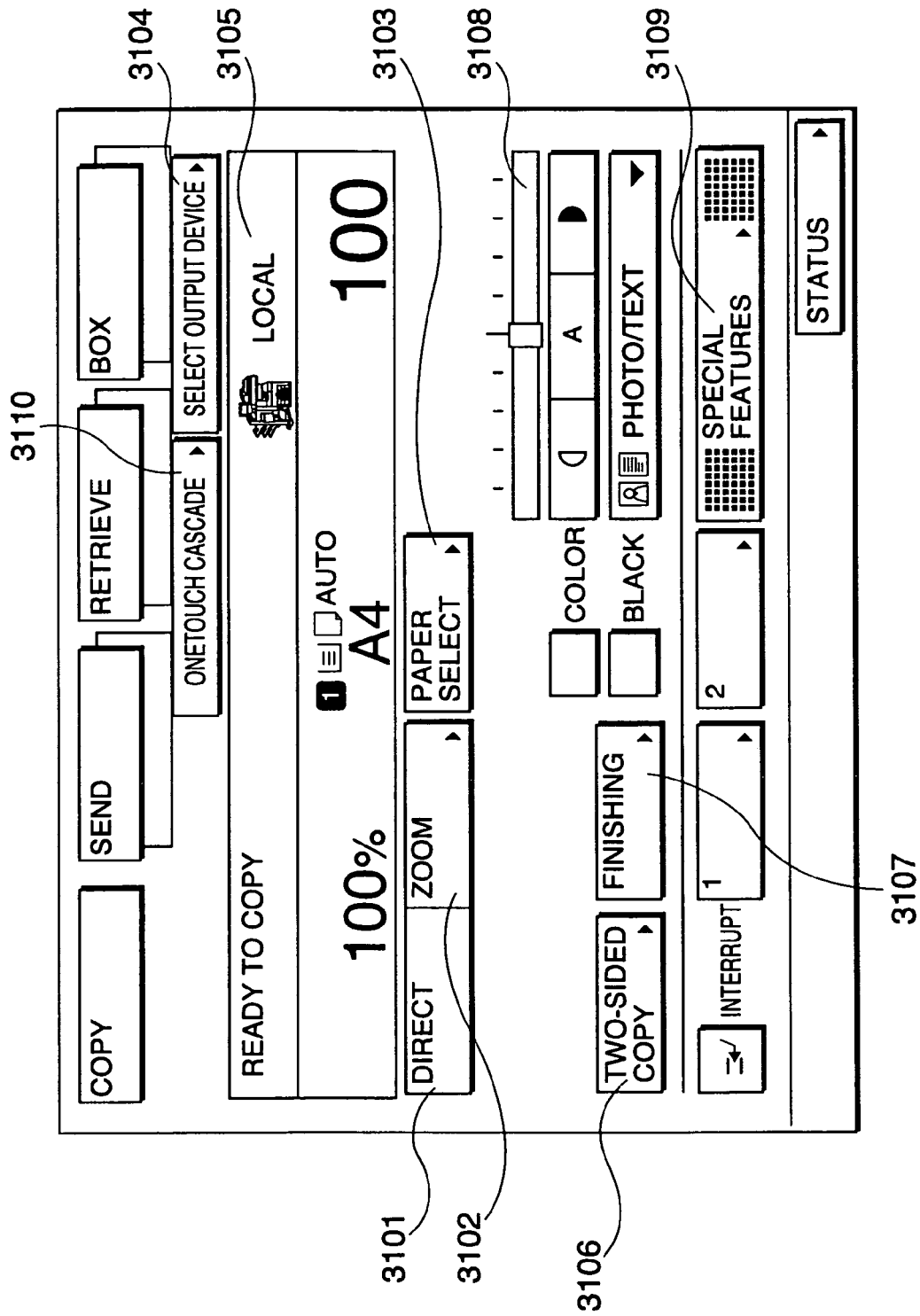
FIG. 13 is a view showing an initial screen displayed on an LCD display section.

FIG. 13 is a view showing an initial screen displayed on the LCD display section 2013 and also acting as a standard screen displayed after the image forming functions have been set.

Reference numeral 3101 denotes a soft key used during image formation to set an equimultiplication output without using the variable power function. Reference numeral 3102 denotes a soft key for setting the variable power function. Reference numeral 3103 denotes a soft key for setting an output sheet size. Reference numeral 3106 denotes a soft key for setting a two-sided output. Reference numeral 3107 denotes a soft key for executing setting for sorting of output sheets. Reference numeral 3109 denotes a soft key for setting other applied functions. Reference numeral 3110 denotes a soft key for allowing the user to easily set the read image or images to be allotted to a plurality of image output apparatus for printing (this will be hereinafter referred to as "the cascade copying"). A soft key, not shown, can be used to set a remote copy mode in which the read image is printed by another image output apparatus. When any of these soft keys is depressed, a display screen for further detailed settings is displayed.

The image input/output apparatus 200 can output image data to the image output apparatus (printer 2295 or 2395) of the remote image input/output apparatus 220 or 230 connected thereto via the LAN 2011 (remote copying) and carry out the cascade copying, but when initialized, it is set to output images to itself (local copying). Depending on whether the operation mode is set for the local copying, remote copying, or cascade copying, a display area 3105 provides a display for ascertaining the setting status of the operation mode. Reference numeral 3108 denotes a group of soft keys for setting an image output density.

Figure 14:
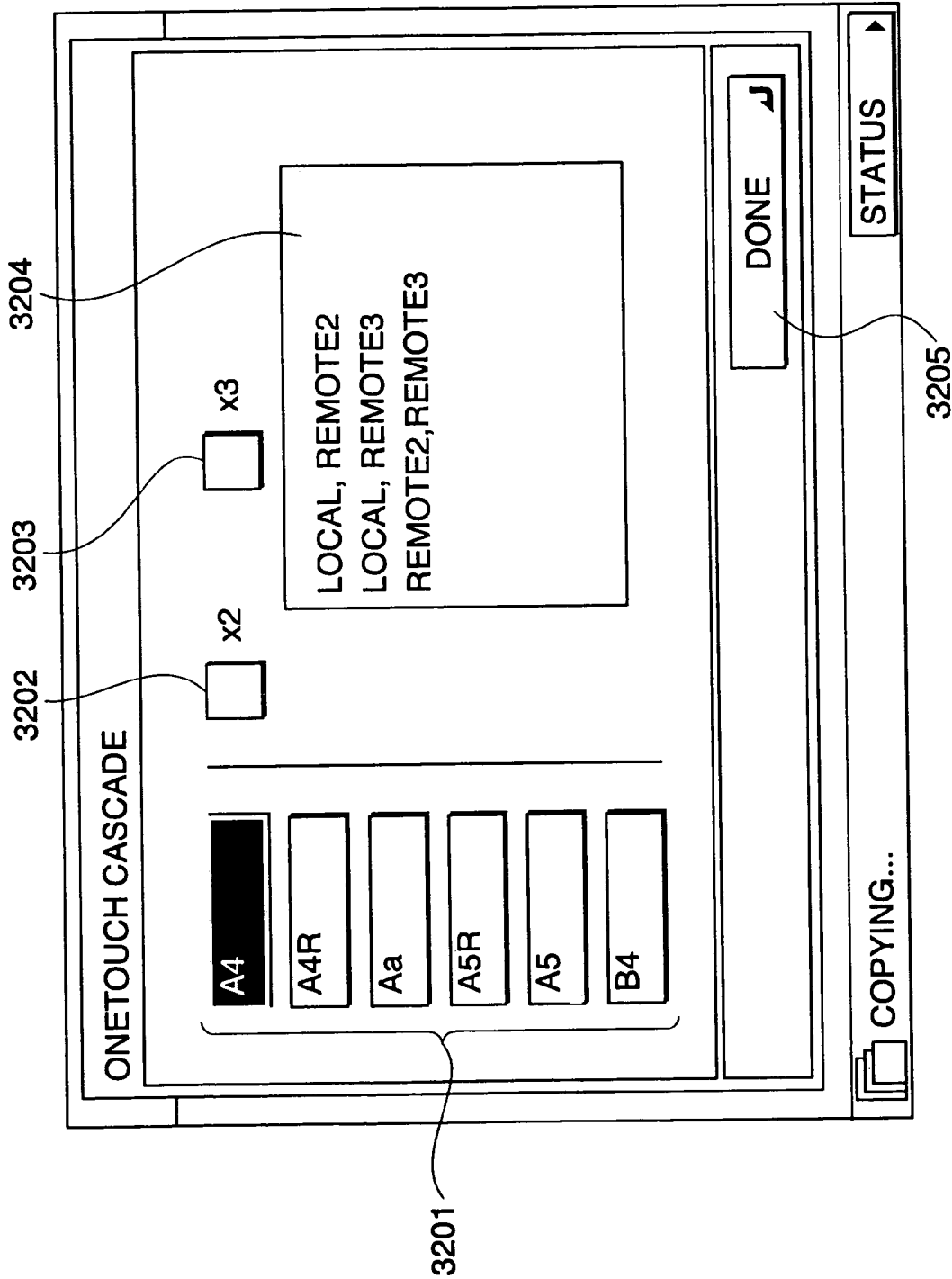
FIG. 14 is a view showing a setting screen displayed when a soft key appearing in FIG. 13 is depressed.

FIG. 14 is a view showing a setting screen displayed when the soft key 3110 shown in FIG. 13 is depressed. This setting screen allows the user to set the cascade copying easily.

Reference numeral 3201 denotes a group of soft keys for designating an output medium (sheet) size; in an initial state, an A4-sized sheet key in the upper left of the screen is selected and reversely displayed or highlighted. A group of soft keys 3201 are toggled such that one of the plurality of keys is always selected and reversely displayed. Reference numeral 3202 denotes a soft key for limiting the number of image output apparatuses for cascade copying to two, and reference numeral 3203 denotes a soft key for limiting the number of image output apparatuses for cascade copying to three. Reference numeral 3204 denotes a display screen for displaying a list of combinations of image output apparatuses from which the image is to be output. When either the soft key 3202 or 3203 is depressed, the display screen 3204 shows a list of combinations of image output apparatuses that can output the image with the sheet size selected by the group of soft keys 3201. FIG. 14 shows three combinations of image output apparatuses selected when the soft key 3202 is depressed. Information on the sizes of sheets on which each of the plurality of image output apparatuses including the local one can form images is stored and managed in a memory of the local apparatus (or a memory of a managing server on the network) in a manner distinguishing the sheet sizes for each of these image output apparatuses, so that the display screen 3204 is controlled to display the combination information based on the stored and managed information.

The image output apparatuses listed in the display screen 3204 are retrieved from a plurality of image output apparatuses which are registered in advance (detailed description of the method of registering these apparatuses is omitted). One of the combinations of the image output apparatuses listed in the display screen 3204 can be selected and reversely displayed by means of a touch input, and a setting enter key 3205 is depressed to complete setting the cascade copying with the selected image output apparatuses. In the display screen 3204, the selection and reverse display can be cleared by depressing the location of the selected and reversely displayed combination of image output apparatuses again. Further, when one of the combinations has been selected and reversely displayed and another combination is selected by depressing its location, the selection and reverse display of the former are cleared, while the latter is reversely displayed.

Figure 15:
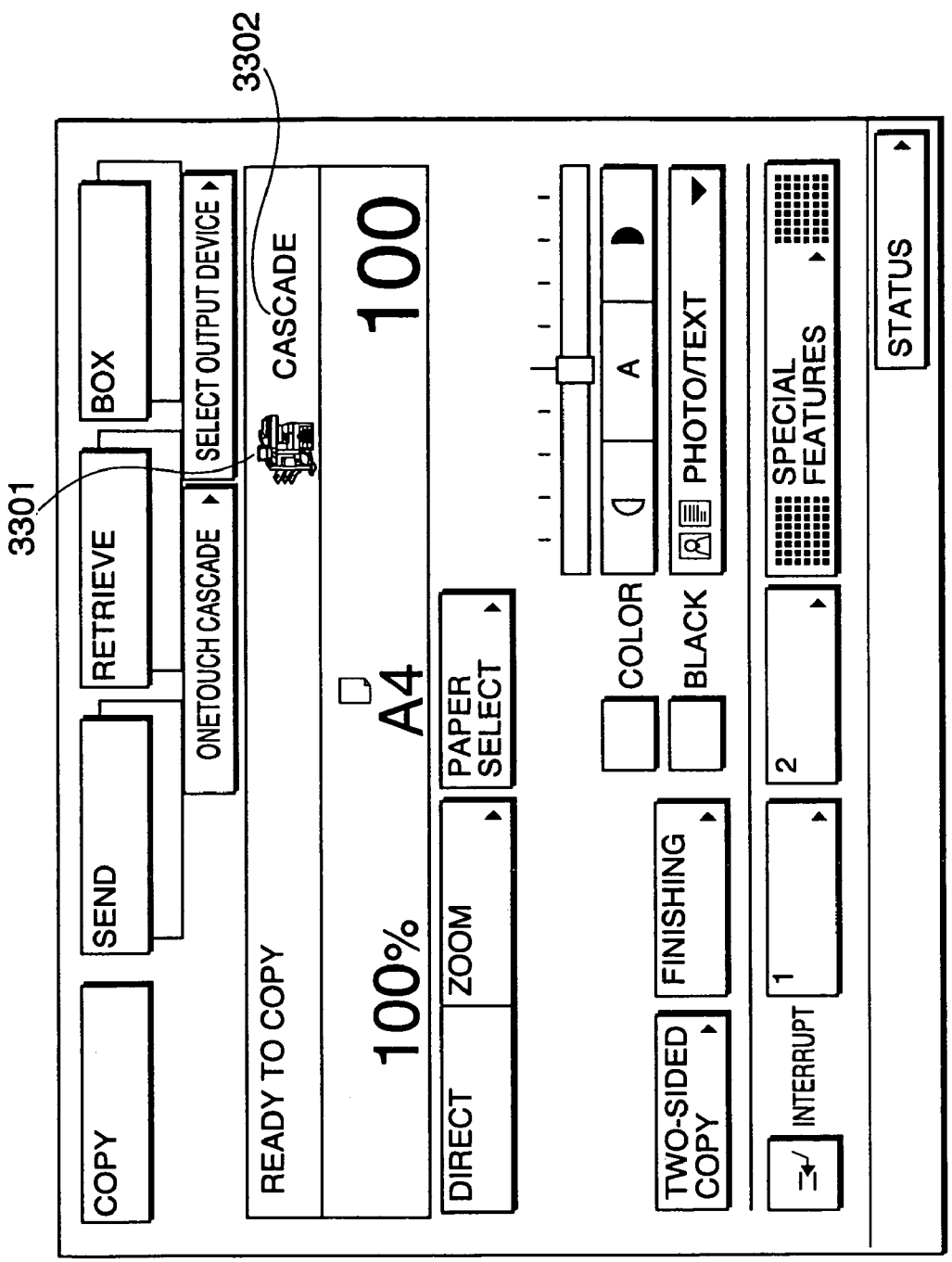
FIG. 15 is a view showing a standard screen displayed when cascade copying is set in the setting screen shown in FIG. 14 and a setting enter key is then depressed.

FIG. 15 is a view showing a standard screen displayed when the cascade copying is set in the setting screen shown in FIG. 14 and the setting enter key 3205 is then depressed.

Reference numeral 3301 denotes an icon indicating that cascade copying has been set. Reference numeral 3302 denotes a character string indicating that cascade copying has been set. The icon 3301 and the string 3302 indicate the contents of settings.

FIG. 16 is a view showing the construction of software for processes executed by the controller unit 2000. Programs for executing the applications shown in FIG. 16 are stored in the ROM 2003. The programs are read out from the ROM 2003 when the image forming apparatus is actuated, and are executed by the CPU 2001. While the image forming apparatus is in operation, the applications shown in FIG. 16 are resident on the RAM 2002.

Reference numeral 4010 denotes a UI control section for controlling the operating section 2012. Reference numeral 4020 denotes a copy application section for causing an equipment control section to execute a copy job. Reference numeral 4030 denotes a common interface section for accommodating an equipment dependent portion of the equipment control section. Reference numeral 4040 denotes a job manager for arranging job information received from the common interface section 4030 and transmitting the information to a document processing section in a lower layer. For local copying, a scan manager 4050 and a print manger 4090 are actuated. For a job of transmitting a remote copy, the scan manager 4050 and a store manager 4100 are actuated. For a job of receiving a remote copy, a file read manager 4060 and the print manager 4090 are actuated. For printing of PDL such as LIPS or PostScript, a PDL manager 4070 and the print manager 4090 are actuated. Synchronization between document managers and requests for image processing are carried out via a synchronization manager 4080. Image processing for scanning or printing and storage of image files are executed by an image manager 4110.

First, a software process for local copying will be described.

The user instructs the UI control section 4010 to execute copying and transmits copy settings to the copy application section 4020. The copy application section 4020 transmits information from the UI control section 4010 to the job manager 4040 that controls equipment, via the common interface section 4030. The job manager 4040 transmits the job information to both the scan manager 4050 and the print manager 4090.

The scan manager 4050 requests, via the device interface 2020, the scanner 2070 to execute scanning. At the same time, the scan manager 4050 issues an image processing request to the image manager 4110 via the synchronization manager 4080. The image manager 4110 sets the scanner image processing section 2080 in accordance with the instruction from the scan manager 4050. Once the settings have been completed, the image manager 4110 informs the scan manager 4050 via that synchronization manager 4080 that preparations for scanning have been completed. Subsequently, the scan manager 4050 instructs the scanner 2070 to execute scanning. When all the scanned images are transferred, the image manager 4110 is informed of this through an interrupt signal from hardware, not shown.

Upon being informed by the image manager 4110 that the scanning operation has been completed, the synchronization manager 4080 communicates this to the scan manager 4050 and the print manager 4090. At the same time, the synchronization manager 4080 instructs the image manager 4110 to store images accumulated in the RAM 2002, in an HDD 2004 as a file.

In accordance with this instruction, the image manager 4110 stores a TIFF-JBIG or TIFF-MMR file in the HDD 2004 using the image compressing section 2040. Once the file has been completely stored in the HDD 2004 and upon receiving a scan completion signal from the scanner 2070, the image manager 4110 notifies the scan manager 4050 via the synchronization manager 4080 that the images have been stored as a file. The scan manager 4050 returns the completion notification to the job manager 4040, which in turn returns it to the copy application section 4020 via the common interface section 4030.

The print manager 4090 issues a print request to the printer 2095 via the device interface 2020 when images are loaded in the RAM 2002. The print manager 4090 then issues an image processing request to the synchronization manager 4080. Upon receiving the request from the print manager 4090, the synchronization manager 4080 requests the image manager 4110 to execute image processing setting. The image manager 4110 sets the printer image processing section 2090 and notifies the print manager 4090 via the synchronization manager 4080 that preparations for printing have been completed. The print manager 4090 gives a print instruction to the printer 2095. Through an interrupt signal from hardware, not shown, the image manager 4110 is informed that all the print images have been transferred.

Upon being informed by the image manager 4110 that the printing operation has been completed, the synchronization manager 4080 communicates this to the print manager 4090. Upon being informed that all the printed sheets have been discharged from the printer 2095, the print manager 4090 returns the completion notification to the job manager 4040, which in turn returns it to the copy application section 4020 via the common interface section 4030. When the scanning or printing operation is completed, the copy application section 4020 notifies the UI control section 4010 that the job has been completed.

Next, a software process for a remote copy scan job (transmission job) will be described.

In place of the print manager 4090, the store manager 4100 receives a request from the job manager 4040. Once all the scanned images have been stored in the HDD 2004, the store manager 4100 is informed by the synchronization manager 4080 that all the images have been stored, and communicates this to the copy application section 4020 via the common interface section 4030. Upon receiving this notification, the copy application section 4020 requests the network application section 4120 to transmit the file stored in the HDD 2004. The network application section 4120, upon receiving the request, transmits the file. The network application section 4120 receives setting information on copying from the copy application section 4020 at the start of the job, and communicates this to the remote side (reception side).

Next, a software process for a remote copy print job (reception job) will be described.

The network application section 4120 saves image data from the transmission side in the HDD 2004, and issues a print job to the copy application section 4020. The copy application section 4020 inputs the print job to the job manager 4040 via the common interface section 4030. In contrast to local copying, the file read manager 4060, in place of the scan manager 4050, receives the request from the job manager 4040. A request for expanding the received images from the HDD 2004 onto the RAM 2002 is issued to the image manager 4110 via the synchronization manager 4080. The image manager 4110 decompresses a TIFF-JBIG or TIFF-MMR file using the image compressing section 2040, to expand the images onto the RAM 2002. Once the expansion has been completed, the image manager 4110 communicates this to the file read manager 4060 and the print manager 4090 via the synchronization manager 4080.

When the images are loaded in the RAM 2002, the print manager 4090 selects a sheet feeding stage indicated by the job manager or a sheet feeding stage having a sheet size for the images, and issues a print request to the printer 2095 via the device interface 2020. For automatic sheet feeding, the print manager 4090 determines the sheet feeding stage based on the image size before issuing the print request. The print manager 4090 then issues the print image processing request to the synchronization manager 4080.

Upon receiving the print image processing request from the print manager 4090, the synchronization manager 4080 requests the image manager 4110 to execute image processing setting. The synchronization manager 4080 also requests the image manager 4110 to give an instruction for rotation as required. Upon receiving the instruction for rotation, the image manager 4110 rotates the images using the image rotating section 2030.

The image manager 4110 sets the printer image processing section 2090 and notifies the print manager 4090 via the synchronization manager 4080 that preparations for printing have been completed. The print manager 4090 gives the print instruction to the printer 2095. Through an interrupt signal from hardware, not shown, the image manager 4110 is informed that all the print images have been transferred. Upon being informed by the image manager 4110 that the printing operation has been completed, the synchronization manager 4080 communicates this to the file read manager 4060 and the print manager 4090. The file read manager 4060 returns the completion notification to the job manager 4040. Upon being informed that all the printed sheets have been discharged from the printer 2095, the print manager 4090 returns the completion notification to the job manager 4040. The job manager 4040 in turn returns it to the copy application section 4020 via the common interface section 4030. When the printing operation is completed, the copy application section 4020 notifies the UI control section 4010 that the job has been completed.

It should be understood that in cascade copying that outputs images to a plurality of pieces of remote equipment, a plurality of transmission and reception jobs as described above in the remote copying are present for one input image.

Next, transmission of information accompanying images (image accompanying information) will be described.

In this embodiment, image data is transmitted page by page to the remote side using a TIFF-MMR or TIFF-JBIG file, so that the image accompanying information is transmitted using a free area in a TIFF header of that file. For both-side printing originals, the image accompanying information is set for each of the front and back sides of the original as one page.

FIG. 17 is a view showing the construction of the TIFF header used in the present embodiment.

Tags shown herein are written to the TIFF header in accordance with the contents of an instruction from the scan manager 4050 when the image manager 4110 stores a file in the HDD 2004.

The notation of the tag names and their sizes complies to a standard "TIFF Revision 6.0 Final Jun. 3, 1992" of Aldus in the U.S.A. Only the tags that have been newly added in order to transmit the image accompanying information to remote equipment and which are not described in the above standard will be described below.

Figure 18B:
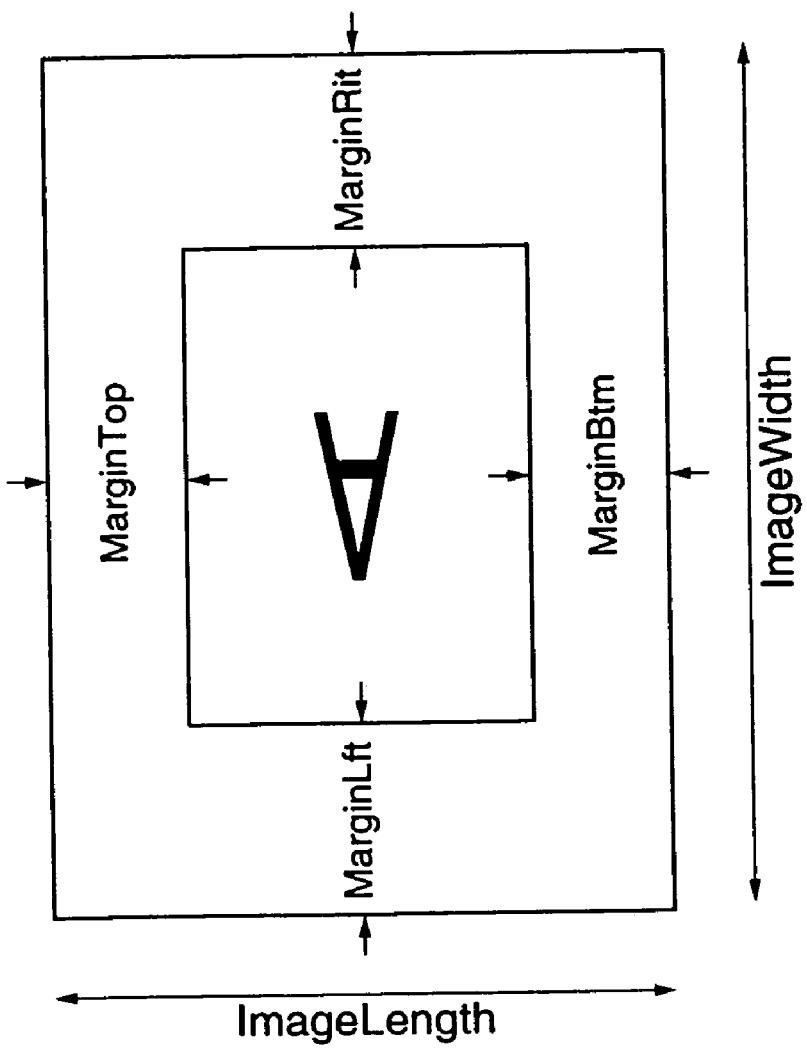
Figure 18A:
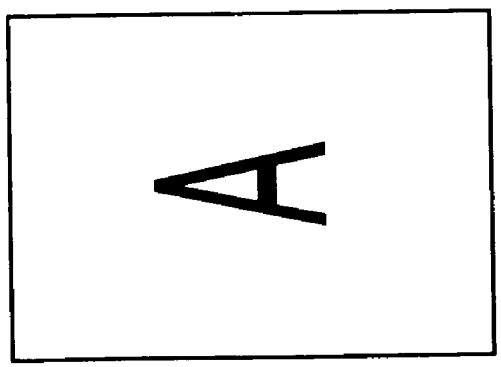

Tags MarginTop, MarginBtm, MarginLft, and MarginRit define margins provided at the top, bottom, left, and right of an image, in terms of the number of pixels. The locations of the margins added to a scanned image are shown in FIGS. 18A and 18B. FIG. 18A shows an original image, and FIG. 18B shows a scanned image.

That is, in both main scanning and sub-scanning, the image rotating section 2030 can only rotate 32 pixels of image at a time due to restrictions on hardware. Thus, when an image is scanned and loaded in the RAM 2002, margins are added to the image area of the original in order to limit the image size to 32 pixels. The margins are typically provided at the right (MarginRit) and bottom (MarginBtm) of the image.

In FIG. 17, the tag ImageKind indicates the type of an original designated by the user from the operating section 2012. The user can designate text, text/photo, or photo for each page, using the operating section 2012.

The tag MediaCode stores the size of the original. The original size is represented by lower eight bits, for example, 0×0001 for an A4-sized sheet and 0×0002 for an A3-sized sheet. Further, for an A4R-sized sheet of the same size as the A4-sized sheet, the direction of the original is represented by, for example, 0×0101 as these eight bits.

The tag Side is used to discriminate between the front side and back side of the original.

The tags WithoutZoomW and WithoutZoomL indicate, in terms of the number of pixels, the image size prior to correction with the margins excluded if the image size has been corrected by means of zoom fine adjustment. That is, the user can fine-adjustment zooming between −1.0% and +1.0% at intervals of 0.1%, and the image size prior to such fine adjustment is set as the tags WithoutZoomW and WithoutZoomL, as shown below.

WithoutZoomW=ImageWidth−MarginRit (1)

WithoutZoomL=ImageLength−MarginBtm (2)

Next, a description will be given of a process executed by the remote side receiving the TIFF header with the image accompanying information as the above tags.

First, the use of the tag Margin will be described. In the remote copying according to the present embodiment, the location of an image to be printed on a sheet can be adjusted based on the tag Margin.

On the remote side, in accordance with an instruction from the print manager 4090, the image manager 4110 determines the location of the image taking the margins into consideration. The location of the image can be easily adjusted by setting the printer image processing section 2090 so as to change timing in which the image is outputted to the printer 2095.

FIGS. 19A and 19B are views showing a print process executed if a "no sheet" status occurs during A4-sized image printing and a B4-sized sheet is then selected.

In FIG. 19A, reference numeral 7010 denotes a A4-sized sheet area, and reference numeral 7020 denotes an image area including the margins. In this case, no problem occurs if an A4-sized image is printed on a single side of an A4-sized sheet. If, however, the "no sheet" status occurs and the user then selects a B4-sized sheet, the image is rotated through 90° in accordance with a request from the print manager 4090 (without the rotation, the image may project out from the sheet and this projecting portion is not printed). At this time, as shown in FIG. 19B, the image location is corrected by shifting an image 7030 leftward relative to a B4-sized sheet area 7040 by the amount indicated by the tag MarginBtm.

In a similar case in which A4-sized sheets are printed on both sides and bound at their top, images for the back sides of the sheets are rotated through 180°. At this time, the image is moved upward by the amount indicated by the tag MarginBtm and leftward by the amount indicated by the tag MarginRit.

Such image location control is similar to that in the local copying, and the remote or cascade copying can thus provide image outputs having quality equivalent to that in the local copying.

Next, the use of the tag ImageKind will be described. In the remote copying according to the present embodiment, the quality of an image to be printed can be adjusted based on the tag ImageKind.

In the local copying, the original type is used as information for image processing. Specifically, the original type is used to determine whether or not to execute smoothing to obscure jagged parts of the image or to determine the level (intensity) of the smoothing. When the image is smoothed during the remote copying, on the remote side, the image manager 4010 determines an image processing method in accordance with an instruction from the print manager 4090, taking the original type into consideration. That is, the intensity of the smoothing, which eliminates jagged parts from characters, is switched depending on the original type. The smoothing process can be easily achieved by properly setting the printer image processing section 2090. In the text mode, the smoothing process is turned on (executed) to obscure jagged parts of characters. In the text/photograph mode, the smoothing process is turned off (not executed) because the density of a photograph portion may be changed due to the smoothing. As a result, an image quality equivalent to that in the local copying can be obtained.

Next, the use of the tag Side will be described. In the remote copying according to the present embodiment, a location of an image to be printed on a sheet can be adjusted based on the tag Side.

Figure 20:
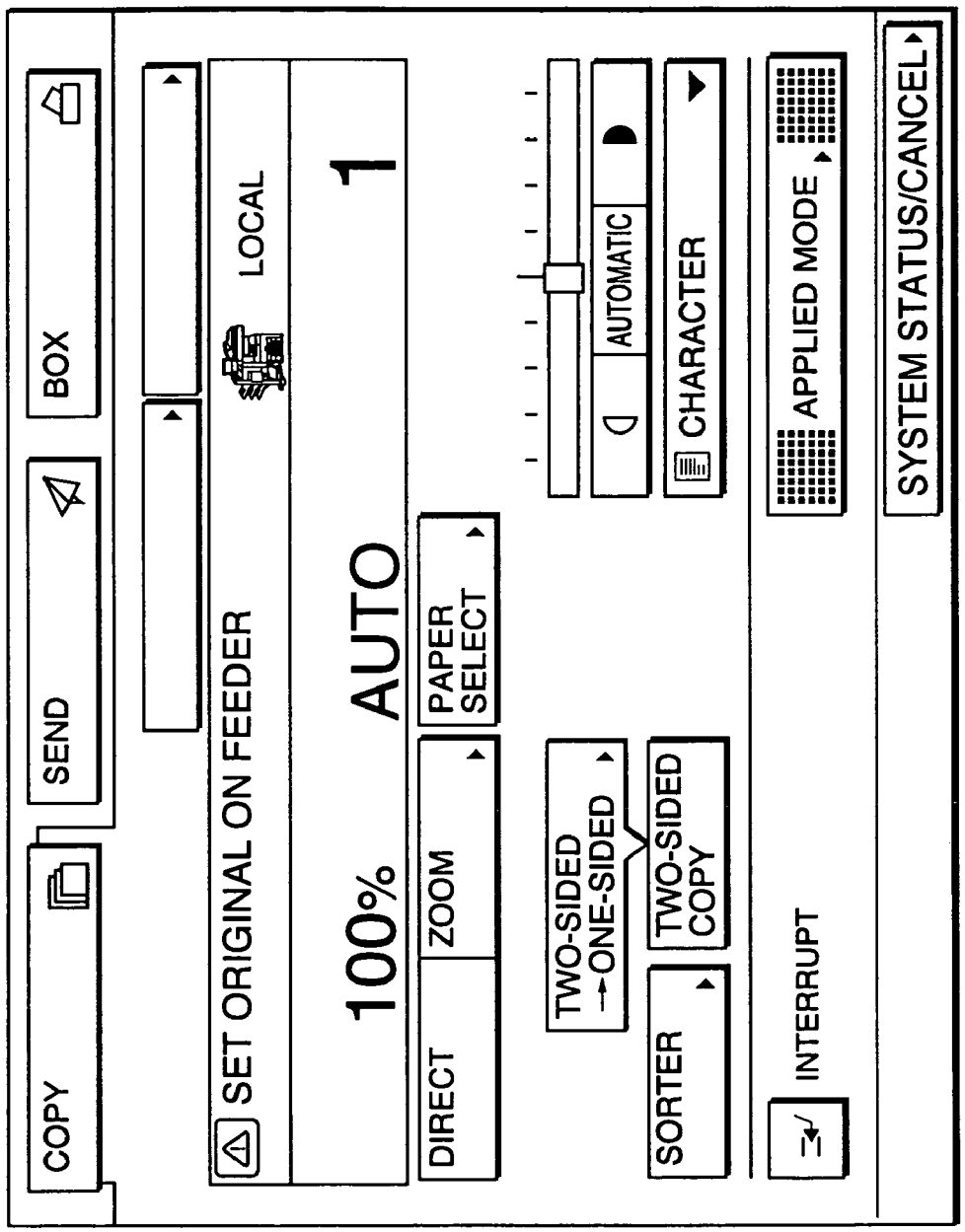
FIG. 20 is a view showing a screen displayed on the operating section when printing designation is switched from double-side printing to single-side printing.
Figure 21:
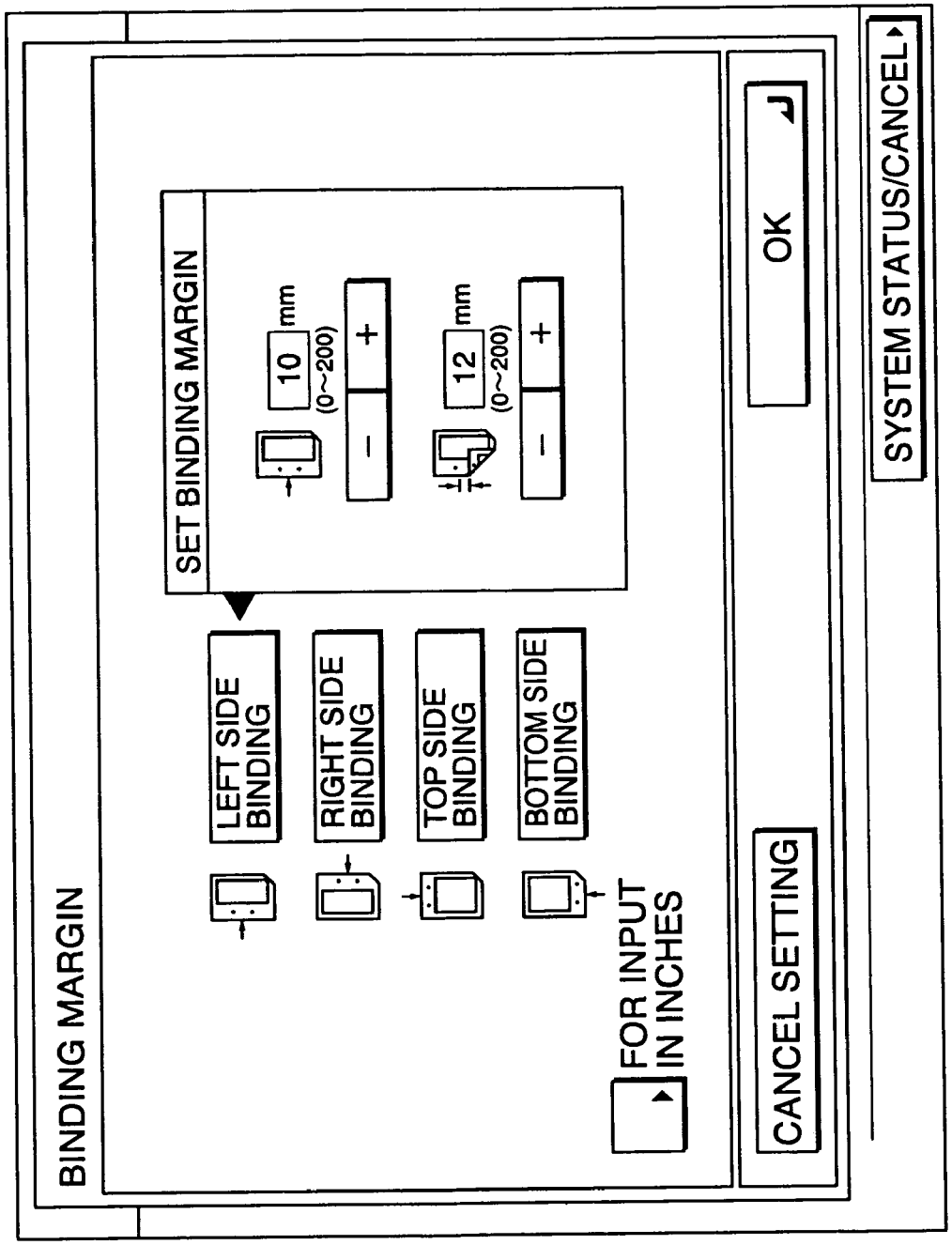
FIG. 21 is a view showing a screen displayed when left side binding is set.

If the user designates printing of images of a double-side original on a single side of a recording sheet using the operating section 2012, as shown in FIG. 20, and sets a binding margin for both the front and back sides, then in the local copying, when the front side is printed, the binding margin is produced using the amount of binding margin for this side. On the other hand, when the back side is printed, the binding margin is produced using the amount of binding margin for this side, as shown in FIG. 21. Accordingly, producing such binding margins on the remote side requires information for discriminating between the front side and back side of the original. FIG. 20 shows a screen displayed on the operating section 2012 when printing of images of a double-side original on a single side of a recording sheet is designated, and FIG. 21 shows a screen displayed on the operating section 2012 when left side binding is set.

When the remote side receives the tag Side from the TIFF header, the print manager 4090 discriminates between the front side and back side of the sheets, sets the remote copy mode, and communicates the amount of shift required for the binding margin to the image manager 4110 in accordance with instructions transmitted through the network application section 4120, the copy application section 4020, the common interface section 4030, the job manager 4040, and the print manager 4090 in this order. The image location can be easily set by the image manager 4110 by setting the printer image processing section 2090 so as to change the timing for outputting the image to the printer 2095.

Figure 22A:
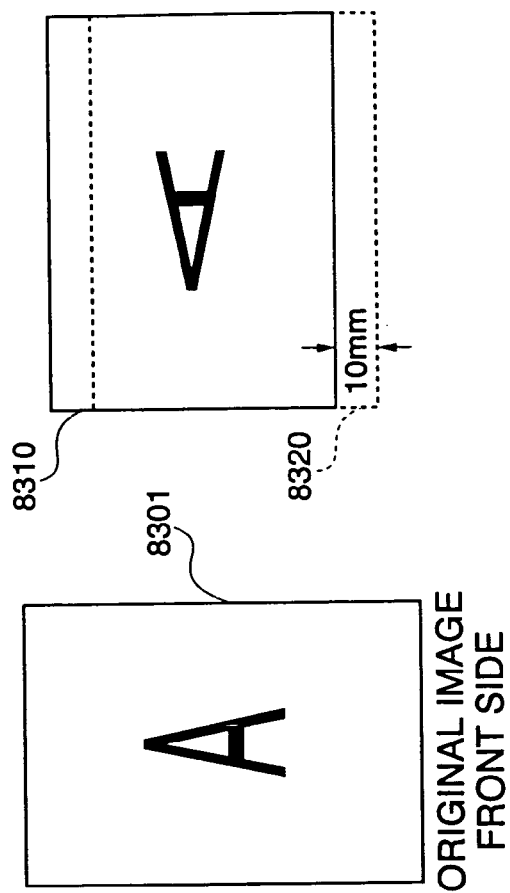
Figure 22B:
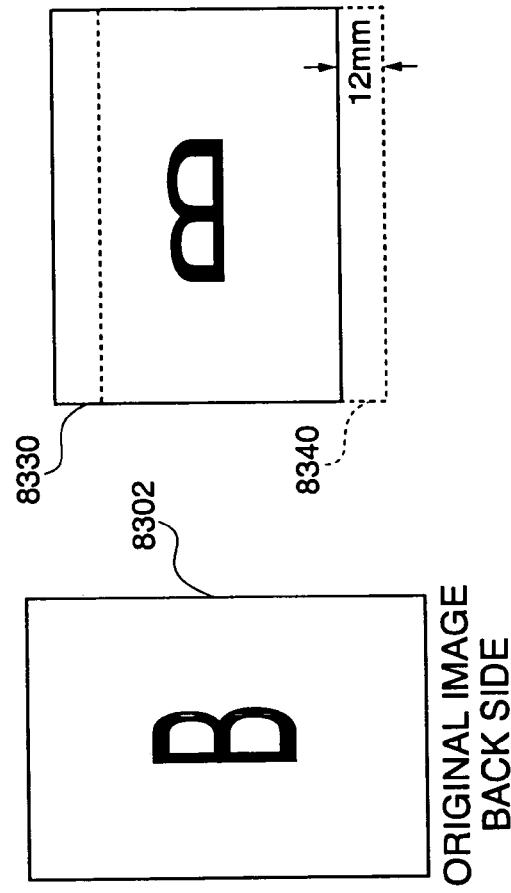

FIGS. 22A and 22B are views showing results of printing when the front side 8301 and back side 8302 of an A4-sized original image are copied in the remote copy mode.

In FIG. 22A, reference numeral 8310 denotes the image on the front side, and reference numeral 8320 denotes the location of an A4-sized sheet for the front side. The binding margin for the original front side is produced by shifting the image 10 mm upward relative to the sheet.

In FIG. 22B, reference numeral 8330 denotes the image on the back side, and reference numeral 8340 denotes the location of an A4-sized sheet for the back side. The binding margin for the original back side is produced by shifting the image 12 mm upward relative to the sheet.

In this manner, the remote copying process can set the binding margin as properly as the local copying process.

Next, the use of the tags WithoutZoomW and WithoutZoomL will be described. In the remote copying according to the present embodiment, selection of a sheet feeding stage and sheets as well as control of rotation can be executed based on the tag WithoutZoomW and WithoutZoomL.

The image input/output apparatus 200 of the present embodiment carries out variable powering during scanning. The variable powering in the main scanning direction is carried out by setting the scanner image processing section 2080, while the variable powering in the sub-scanning direction is carried out by changing the scan speed of the scanner 2070. When the user sets the zoom fine adjustment using the operating section 2012, the scan manager 4050 carries out variable powering by providing variable power information to both the scanner 2070 and the image manager 4110. Thus, during scanning, the image size varies with the power or scale factor. If the zoom fine adjustment causes the image size to increase slightly beyond the sheet size, a sheet size that is not desired by the user may be selected during automatic sheet selection. For example, with a scale factor of 100%, the A4 image size corresponds to 7015×4960 pixels. With a scale factor of 101%, however, this image size corresponds to 7076×5010 pixels and does not fit a predefined A4 sheet size (7015×4960 pixels). Consequently, sheets of a larger size such as B4 (6071×8598 pixels) may be selected, or an A3 (7015×9220 pixels) size may be selected if no B4-sized sheets are available. In conventional copying machines (local copying), if zoom fine adjustment is carried out, the sheet size is selected based on the image size after the zoom fine adjustment.

In the present embodiment, if the user sets the automatic sheet selection for the remote copying using the operating section 2012, and the remote printer then selects the sheet size, then the image size after the zoom fine adjustment is neglected, and the sheet size is selected based on the tags WithoutZoomW and WithoutZoomL, which are indicative of the image size before the zoom fine adjustment. As a result, even if the zoom fine adjustment results in a slight increase in image size, the sheet size is selected depending on the image size before the zoom fine adjustment, thereby preventing the image from being output to unnecessarily large sheets. Thus, the remote copying process or cascade copying process can select sheets as properly as the local copying process.

During the above sheet selection, the A4-sized sheet is selected, but if no A4-sized sheet is left on the selected sheet feeding stage, another sheet feeding stage has to be selected and corresponding sheet selection and rotation control (for example, control required to select the B4-sized sheet as shown in FIG. 19) has to be executed. Also in this case, selection of the sheet feeding stage and rotation control may be executed based on the tags WithoutZoomW and Without Zoom L.

In the above described embodiment, the TIFF header containing the image accompanying information as tags is transmitted, but this may be communicated between network applications as information separate from the image.

Further, the above described transmission of the image accompanying information for the remote copying also applies to the cascade copying.

Figure 23:
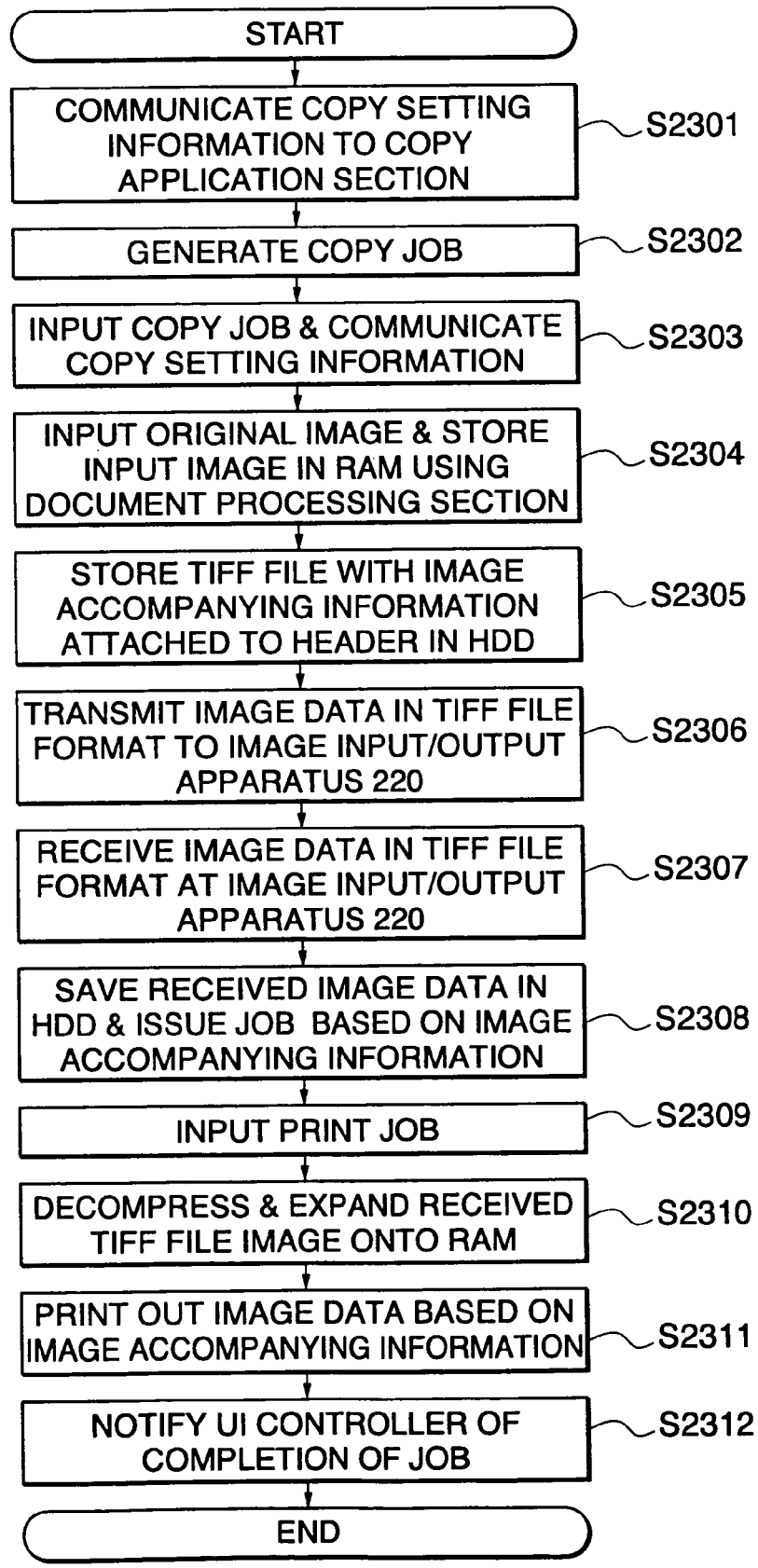
FIG. 23 is a flow chart useful in explaining a remote copy process executed by the system shown in FIG. 1.

Next, the remote copying process executed in the system shown in FIG. 1 will be described with reference to a flow chart shown in FIG. 23. Here, it is assumed that the image input/output apparatus 200 acts as the local side, and the image input/output apparatus 220 acts as the remote side.

First, in the image input/output apparatus 200, that is, the local side, in response to the setting of remote copying and the start instruction from the operating section 2012, the UI control section 4010 communicates copy setting information to the copy application section 4020 (step S2301).

Based on the received copy setting information, the copy application section 4020 generates a copy job (step S2302).

The copy application section 4020 inputs the generated copy job to the job manager 4040 via the common interface section 4030. At this time, the copy application section 4020 also communicates the copy setting information to the job manager 4040 (step S2303).

Then, the job manager 4040 communicates the copy setting information on the input job to a document processing section (scan manager 4050, synchronization manager 4080, image manager 4110, and others) in a lower layer. The document processing section processes the copy job under the control of the job manager 4040 based on the input copy setting information. At this time, as in the above described local copying, the scanner 2070 receives original images, and the input original data is temporarily accumulated in the RAM 2002 (step S2304).

The scanned images accumulated in the RAM 2002 are converted into a TIFF file, which is then stored in the HDD 2004. At this time, the header of the TIFF file contains the already received copy setting information (binding margin information in FIG. 21 and the like) and information (original-front and back information and the like) obtained through processing executed by the document processing section (step S2305).

Once all the scanned images have been stored in the HDD 2004, the copy application section 4020 requests the network application section 4120 to transmit the file stored in the HDD 2004. Upon receiving the request, the network application section 4120 transmits the TIFF file with the image accompanying information to the remote side (image input/output apparatus 220). Although in the present embodiment, the network application section transmits the TIFF file as it is, the image accompanying information may be added to the header when the TIFF file is transmitted (step S2306).

In this way, the image data processed by the image input/output apparatus 200 is transmitted to the image input/output apparatus 220 as the remote side, which then starts its process.

In the image input/output apparatus 220, the network application section 412 receives the image data in the form of TIFF file from the image input/output apparatus 200 (step S2307).

The network application section 4120 saves the received image data in the HDD 2004 and issues a print job to the copy application section 4020 (step S2308).

The copy application section 4020 inputs the print job to the job manager 4040 via the common interface section 4030 (step S2309).

The job manager 4040 instructs the document processing section (file read manager 4060, synchronization manager 4080, image manager 4110, print manager 4090, and others) to execute the job. Based on the instruction and under the control from the job manager 4040, the document processing section decompresses the received TIFF file stored in the HDD 2004 to expand it onto the RAM 2002 (step S2310).

Once the expansion has been completed, the job manager 4040 instructs the document processing section to execute a process based on the image accompanying information attached to the header of the TIFF file. As described above, the print manager 4090, the synch manager 4080, and the image manager 4110 carry out selection of the sheet feeding stage, setting of the image location, setting of margins, setting image processing, and the like, and the printer 2295 prints out the received images (step S2311).

When all the printed sheets have been discharged from the printer 2295, the copy application section 4020 notifies the UI control section 4010 that the job has been completed (step S2312).

The remote copying process in the system shown in FIG. 1 has thus been described, but the above description also applies to the cascade copying. That is, the image input/output apparatus 220 and the image input/output apparatus 230 may be defined as the remote side, and the step S2306 and the subsequent steps may be executed on these apparatuses.

In the present embodiment, the image data is converted into the TIFF format (TIFF-JBIG or TIFF-MMR), and the image accompanying information is added to the header of the data. This eliminates the need to separately transmit the image accompanying information, thus reducing the load on the network and simplifying the sequence of remote output processes. The format of the image data, however, is not limited to this. The present invention is applicable to any format such as the XML (extensible Markup Language) which can contain not only the image data but also the image accompanying information.

Further, in the present embodiment, the image input/output apparatuses having the same configuration act as the local apparatus and the remote apparatus, but the present invention is not limited to this. For example, the remote side may be a unitary printer apparatus without any scanner section. In this case, the construction of the printer apparatus corresponds to the construction of the image input/output apparatus of the present embodiment excluding a construction for the scanner function. Accordingly, the printer apparatus as the remote side can be implemented easily. On the other hand, the local side may be a unitary scanner apparatus without any printer section. In this case, the construction of the scanner apparatus corresponds to the construction of the image input/output apparatus of the present embodiment excluding a construction for the printer function. Accordingly, the scanner apparatus as the local side can be implemented easily.

Moreover, it is to be understood that the present invention is not only applicable to digital composite machines, printer apparatuses, and scanner apparatuses but also to any other apparatuses such as Internet facsimile terminal apparatuses which have the image input and output functions.

As described above, the local side transmits the image data and its image accompanying information input thereto through the scanner section, to the remote side. The remote side receives the image data and the image accompanying information from the local side, and causes the printer section to output images based on the received image data and image accompanying information. Thus, the remote side can obtain results of image outputs equivalent to those on the local side.

Second Embodiment

An automatic cassette selecting operation of selecting an optimal sheet size for image output has been performed by the local image input/output apparatus. Then, an instruction for a printout operation using a cassette for the selected sheet size is transmitted to the remote image output/output apparatus.

That is, the image input/output apparatus on the remote side cannot autonomously select a cassette but is controlled by the local image input/output apparatus. In the present embodiment, a remote image input/output apparatus that can manage sheet cassettes and automatically select sheets will be described.

First, the conventional automatic cassette selection will be described in brief. The automatic cassette selection is an operation mode in which the image input apparatus detects the size of an input image and automatically selects one of the cassettes provided in the image output apparatuses which has optimal sheets set therein. By selecting the optimal sheet size using the automatic cassette selection, the user can execute setting of the sheet size, etc. easily. Also in the present embodiment, the scanner of each image input/output apparatus is provided with a sensor for detecting the size of originals. Original size information obtained is communicated from the scanner to the controller unit for management.

Next, the management of the sheet cassettes according to the present embodiment will be described. As shown in FIG. 3, the image input/output apparatus 200 of the present embodiment is provided with a plurality of sheet cassettes 2101 to 2104 in the printer 2095. These sheet cassettes can transmit and receive cassette information to and from the controller unit 200 via the bus 2096.

The cassette information obtained from the printer 2095 by the CPU 2001 is retained in the RAM 2002. The cassette information includes size information retained by each sheet cassette and the presence of sheets in each sheet cassette.

The sheet cassettes each include a sensor for detecting the presence of sheets. During a printout operation, the CPU 2001 checks the results of the detection by the sensor as transmitted from the printer 2095 whenever an image from each original is output. If the CPU 2001 detects information indicative of the absence of sheets, it temporarily stops the printout operation and starts a predetermined error process.

Next, the automatic cassette selection according to the present embodiment will be described. Conventionally, in the remote copying or cascade copying, the local image output apparatus obtains cassette information on the remote side beforehand. Then, the local side carries out the automatic cassette selection by selecting a sheet cassette of the remote side which is optimal for image outputs, based on the obtained cassette information.

In the present embodiment, the local side does not select the sheet cassettes of the remote side, but the remote side carries out cassette selection. That is, the remote image input/output apparatus detects the size of a received image and automatically selects one of the cassettes provided therein which has optimal sheets set therein.

As described with respect to the first embodiment, in the present embodiment as well, the local image input/output apparatus transmits the image data in the TIFF file format to the remote image input/output apparatus. As shown in FIG. 17, the header of the TIFF file has the tags ImageWidth and Image Length attached thereto and which are representative of the size of the image.

The remote image input/output apparatus analyzes the header of the received TIFF file to determine the size of the image based on the values of the tags ImageWidth and ImageLength. The remote image input/output apparatus then compares the determined image size with the sheet size information stored in the RAM 2003, to select a sheet cassette retaining sheets of a size most suitable for the printout. Alternatively, the received data may be stored so that after the reception has been completed, the image size can be determined by counting the number of pixels in the image.

Next, a description will be given of a case in which the automatic cassette selecting process of the present embodiment is applied to the remote copying in the system shown in FIG. 1. In this case, it is assumed that the image input/output apparatus 200 acts as the local side, whereas the image input/output apparatus 220 acts as the remote side. That is, in this case, the automatic cassette selection is carried out when an image read by the scanner 2070 is output to the printers 2095 and 2295.

The printer 2095 and 2295 are black and white printers that can print both sides of sheets, and the printer 2395 is a black and white printer that cannot print both sides of sheets. The operating section 2012 of the controller unit 2000 is provided with a start key for starting reading the image.

Figure 24:
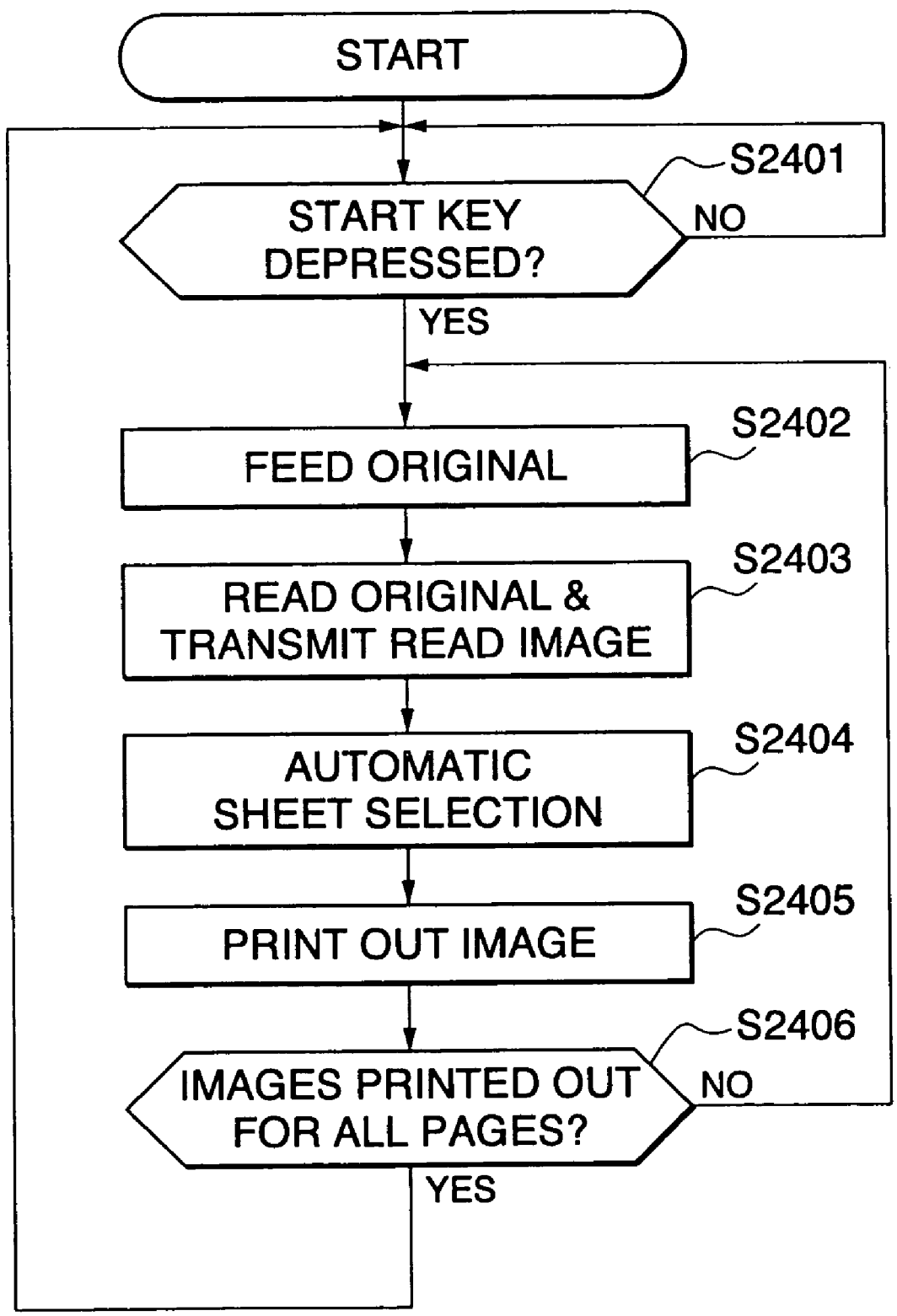
FIG. 24 is a flow chart showing the procedure of an image output process executed by the controller unit 2000.

FIG. 24 is a flow chart showing the procedure of an image output process executed by the controller unit 2000 of the local image input/output apparatus 200. A program for this process is stored in the ROM 2003 in the controller unit 2000 and is executed by the CPU 2001.

First, it is determined whether or not the start key has been depressed (step S2401), and the CPU waits until the start key is depressed. If the start key has been depressed, an original is fed to the scanner 2070 (step S2402). Immediately when the scanner 2070 has read the image from the original, the image is transferred to the local black and white printer 2095 as well as to the remote black and white printer 2295 via the LAN 2011 (step S2403).

To print the read image on the local side, the black and white printer 2095 automatically selects one of the cassettes (step S2404) and prints out the image on a sheet from the selected cassette (step S2405).

Then, it is determined whether or not images have been printed for all the pages (step S2406). If images have not been printed for all the required pages, the procedure returns to the step S2402 to process all the originals. On the other hand, if, at the step S2406, it is determined that images have been printed for all the pages, the procedure returns to the step S2401 to determine whether or not the start key has been depressed.

Figure 25:
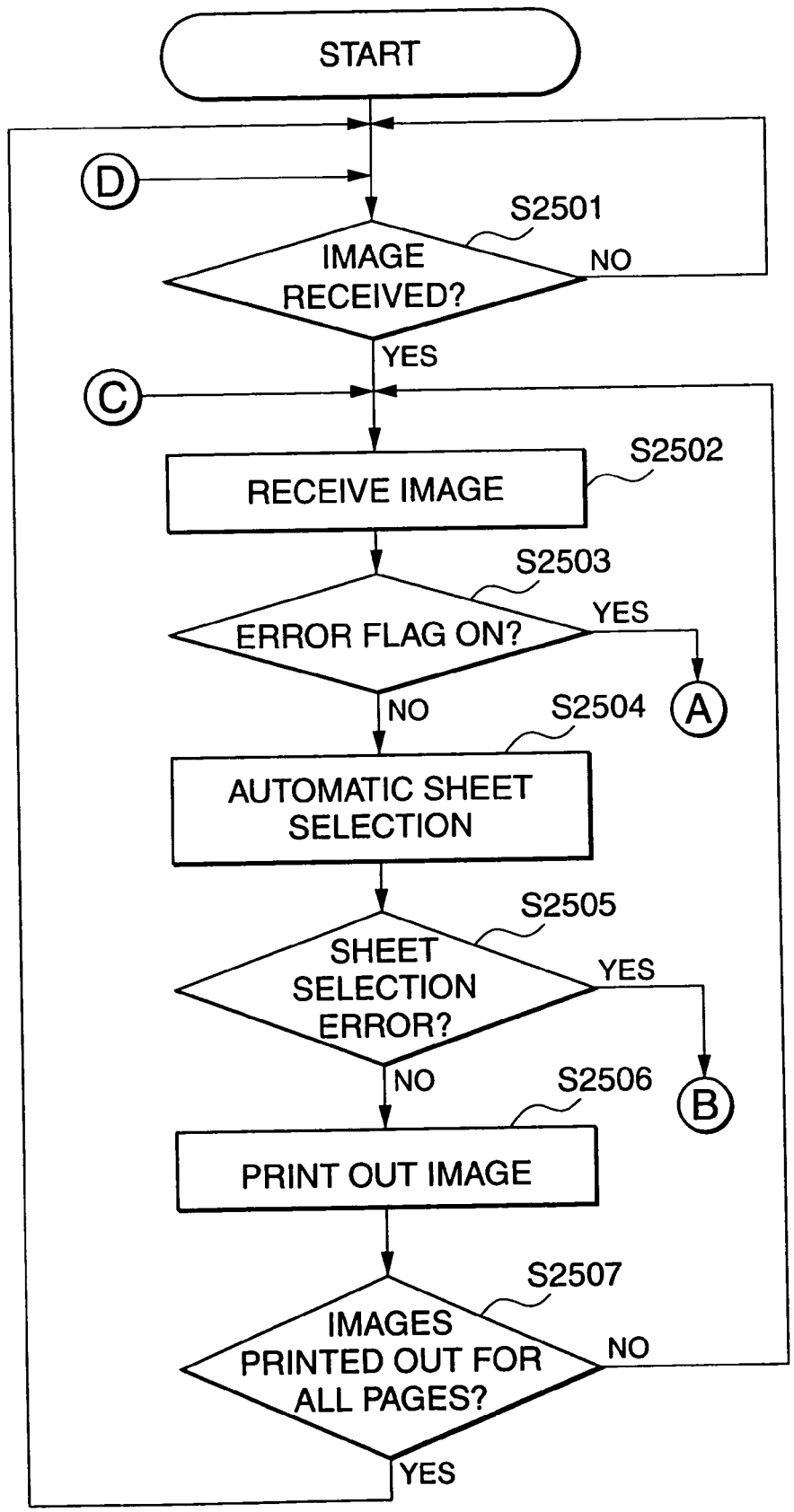
FIG. 25 is a flow chart 1 showing the procedure of an image output process executed by an image input/output apparatus 220 as a remote side.
Figure 26:
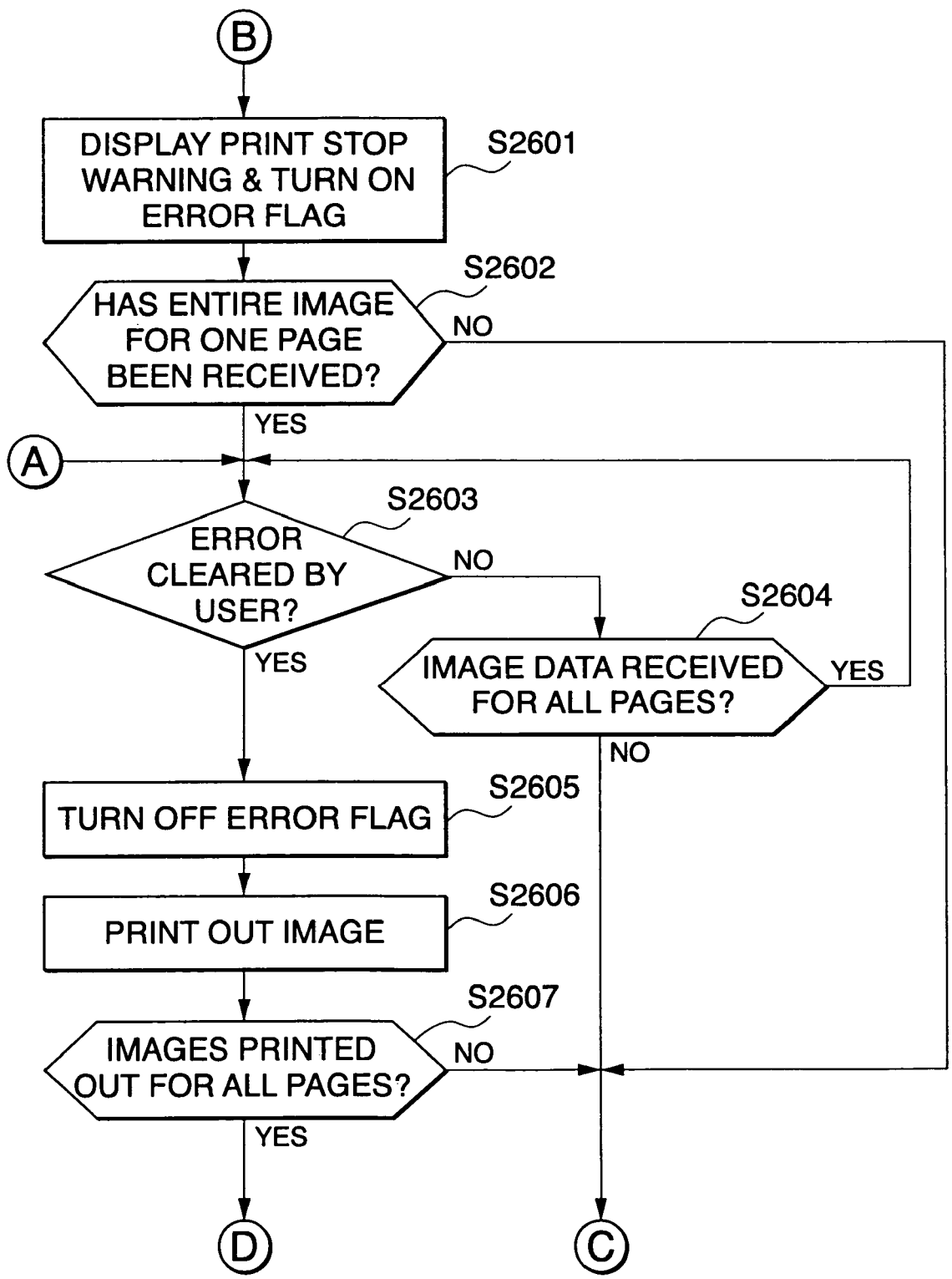
FIG. 26 is a flow chart 2 showing a continued part of the procedure of the image output process executed by the image input/output apparatus 220 as the remote side.

FIGS. 25 and 26 show flow charts showing the procedure of an image output process executed by the remote image input/output apparatus 220. A program for this process is stored in the storage medium (ROM 2003 or HDD 2004) of the image input/output apparatus 220 and is executed by the CPU 2001. The black and white printer 2295 is provided with a plurality of cassettes housing sheets of respective different sizes; information (cassette information) on these cassettes is already stored in a storage medium such as the RAM.

First, a description will be given, with reference to the flow chart in FIG. 25, of the procedure of a normal output process executed when there is no error such as the lack of sheets of an optimal size at the time of the automatic cassette selection.

First, it is determined via the LAN 2011 whether or not any image has been received (step S2501). If no image has been received, the CPU waits until an image is received. When an image is received, one page of the image is received via the LAN 2011 (step S2502).

Next, it is determined whether or not an error flag concerning a sheet selection error is set (on). This error flag is set when it is determined at a step S2505 that the sheet selection error has occurred. The flag remains off until the result of the determination becomes affirmative; in this case, the result of the determination is negative (step S2503).

If one page of the image has been received, the automatic cassette selection is executed to select a cassette from which sheets are to be fed (step S2504).

If there is no sheet of the optimal size based on the automatic cassette selection, that is, if the error has occurred, the procedure proceeds to an error process started at a step S2601 (step S2505). As this error process, a warning is displayed to indicate that there is no sheet of the optimal size in the printer. In this case, a cassette housing sheets determined to be the second most suitable may be selected or the user may be urged to replace this cassette. Furthermore, if the user is urged to replace the cassette, a sensor or the like may detect that the user has replaced the cassette with a new one, and an optimal sheet size may then be selected again.

If it is determined at the step S2505 that no error has occurred, then a sheet is fed from the selected cassette, and the image is printed out on the fed sheet (step S2506). Then, it is determined whether or not images have been printed for all the pages (step S2506). If all the required pages have not been printed, the procedure returns to the step S2502 to receive image data for the next page. On the other hand, if images have been printed for all the pages, the procedure returns to the step S2501 to determine whether or not any image has been received.

Next, a description will be given, with reference to the flow charts shown in FIGS. 25 and 26, of the procedure of a process executed when an error such as the lack of sheets of the optimal size occurs during the automatic cassette selection on the remote side.

After the image of the first page has been received and before the automatic cassette selection is carried out, the procedure of the process between the steps S2501 and S2504 is executed as in the normal print process executed if no error occurs. At the step S2505 and subsequent steps, an error process different from the one described above is executed.

First, a case in which the error occurs will be described. As a result of the determination as to whether or not the sheet selection error has occurred at the step S2505, the procedure proceeds to the error process shown in FIG. 26. Then, a print stop warning is displayed on the display screen of the operating section 2212 of the image input/output apparatus 220, and the above-mentioned error flag is turned on (step S2601).

Then, it is determined whether or not the entire image for the page transmitted from the local side has been received (step S2606). If the entire image has been received, an error clearing process is started, whereas if not the entire image has been received, the procedure returns to the step S2502 to receive the remaining portion of the image for the page which has not been received.

In this case, if not the entire image for the page has been received, the procedure returns to the step S2502 to continue receiving the image for the page. Then, it is determined whether or not the error flag is on (step S2503). Since the error flag is on due to the existing error as shown at the step S2601, the procedure goes through the step 2503 (YES) and the step S2601 to the step S2602 to determine again whether or not the entire image has been received.

Thus, the above determinations and image reception are carried out until the image input/output apparatus receives the entire image for one page. Once the entire image for the page has been received, it is determined whether or not the user has cleared the error according to the error process (step S2603).

As mentioned above, the error is cleared by the user by visiting the installation site of the remote image input/output apparatus 220 and selecting a cassette that he or she considers to be appropriate, or replacing the cassette with a new one, for example.

If the error has not been cleared, it is determined whether or not image data for all the pages have been received (step S2604). If image data for all the pages have been received, the procedure returns to the step S2603. If image data for all the pages have not been received, the procedure returns to the step S2502, where the CPU receives image data for the next page and waits for the user to clear the error.

If the user clears the error at the remote image input/output apparatus 220, the error flag is turned off (step S2605), and the printer 2295 prints out the image using a cassette set by the error clearing operation (step S2606).

Then, it is determined whether or not images have been printed out for all the pages. If images have not been printed out for all the pages, the procedure returns to the step S3502 to receive image data for the next page.

On the other hand, if images have been printed out for all the pages, the procedure returns to the step S2501 to determine whether or not any image has been received and wait for a reception if no image has been received yet.

As described above, even if an error such as the lack of sheets of the optimal size occurs during the automatic cassette selection, according to the present embodiment, the remote printer 2295 is caused to select one of the cassettes to deal with the lack of sheets, thereby simplifying the user's operation.

The embodiments of the present invention have been described, but the present invention is not limited to these embodiments. The present invention is applicable to any constructions insofar as they can achieve the functions shown in the claims or the functions of the constructions of the embodiments.

For example, in the above embodiments, the size and orientation of sheets are collectively referred to as "the size", but the cassette may be selected based on the type of sheets instead of the size thereof. Further, the material of sheets for use in image formation is not limited to paper but may be film sheets.

In the above embodiments, images are output to the remote printer 2295, but the present invention is also applicable to outputting of images to the remote printer 2396. The printers may each manage the cassette information to select the optimal cassette, and may display a warning if the optimal cassette is absent. Further, this may be applicable to the printer 2095 locally connected to the control unit 2000.

Moreover, the remote image output apparatus may be a unitary printer or a system comprised of a plurality of apparatuses (for example, a host computer, an interface device, a reader, and a printer).

It is to be understood that the present invention may also be realized by supplying a system or an apparatus with a storage medium which stores the program code of software that realizes the functions of one of the above described embodiments. In this case, the program code itself read out from the storage medium realizes the above described functions of the present invention, so that the storage medium storing the program code also constitutes the present invention.

In the above embodiments, the program code shown in the flow charts is stored in the storage medium. The storage medium for supplying the program code may be selected, for example, from a ROM, floppy disk, hard disk, optical disk, magneto-optical disk, CD-ROM, CD-R, DVD, magnetic tape, and non-volatile memory card.

As described above, the remote apparatus of the system shown in FIG. 1 manages the cassette information on the sheet cassettes provided in the printer section and automatically selects one of the cassettes based on the managed cassette information. When the remote side is to output the image data received from the local side, it automatically selects a sheet based on the image size of the received image data and under its own control. This enables the remote side to carry out the automatic sheet selection and control related to the sheet selection.

Further, when an error occurs in the remote output, the operator can operate the operation panel of the remote side to select a cassette different from the one involved in the error. As a result, the remote side alone can recover from the error.

Furthermore, the remote side can continue receiving the image data from the local side until the operator selects a different cassette, thus reducing the amount of time required for error recovery.

Moreover, the remote side receives the image data page by page while waiting for the operator to select a different cassette, and therefore the operator can recover from the error by taking the contents of each page into consideration. As a result, the printout operation can be performed more flexibly during the error recovery.

The present invention has been described in connection with the preferred embodiments thereof. The present invention, however, is not limited to the above described embodiments, but various changes may be made thereto without deviating from the scope of the invention as claimed in the claims.

What is claimed is:

1. An image input/output apparatus having input means for inputting image data of original images, and output means for outputting image data, said apparatus being connected to at least one other image input/output apparatus via a communication medium, comprising:
   transmission means for transmitting the image data input by said input means and image accompanying information relating to the input image data including at least a size of the input image data to said at least one other image input/output apparatus;
   receiving means for receiving image data and image accompanying information relating thereto from said at least one other image input/output apparatus; and output control means for carrying out control so as to output images using said output means based on the image data and the image accompanying information received by said receiving means and selecting a size of a sheet to be output based on the size of the input image data.

2. An image input/output apparatus as claimed in claim 1, wherein said output means is a printer, and said output control means adjusts a printing position of an image on a printing sheet in said printer, based on the image accompanying information.

3. An image input/output apparatus as claimed in claim 1, wherein the image accompanying information is indicative of a type of original, and said output control means adjusts output quality of an image on a recording medium based on the image accompanying information.

4. An image input/output apparatus as claimed in claim 3, wherein said output means is a printer, and said output control means adjusts image quality of an image to be printed by said printer, based on the image accompanying information.

5. An image input/output apparatus as claimed in claim 1, wherein the image accompanying information is indicative of sizes of margins contained in the image data corresponding to the image accompanying information, and said output control means adjusts an output position of an image on a recording medium based on the image accompanying information.

6. An image input/output apparatus as claimed in claim 5, wherein said output means is a printer, and said output control means adjusts a printing position of an image on a printing sheet in said printer, based on the image accompanying information.

7. An image input/output apparatus as claimed in claim 1, wherein the image accompanying information is indicative of an image size before fine adjustment of image size is carried out, and said output control means carries out at least selection of a recording medium based on the image accompanying information.

8. An image input/output apparatus as claimed in claim 1, wherein said input means is a scanner.

9. An image input/output apparatus as claimed in claim 1, wherein said transmission means transmits the image accompanying information using a free area in a header of a TIFF file.

10. A method of controlling an image input/output apparatus having an input section that inputs image data of original images, and an output section that outputs image data, and being connected to at least one other image input/output apparatus via a communication medium, comprising:
   a transmission step of transmitting the image data input by said input section and image accompanying information relating to the input image data including at least a size of the input image data to said at least one other image input/output apparatus;
   a receiving step of receiving image data and image accompanying information relating thereto from said at least one other image input/output apparatus; and
   an output control step of controlling so as to output images using said output section based on the image data and the image accompanying information received through said receiving step and selecting a size of a sheet to be output based on the size of the input image data.

11. A method as claimed in claim 10, wherein said output section is a printer, and said output control step comprises adjusting a printing position of an image on a printing sheet in said printer, based on the image accompanying information.

12. A method as claimed in claim 10, wherein the image accompanying information is indicative of a type of original, and said output control step comprises adjusting output quality of an image on a recording medium based on the image accompanying information.

13. A method as claimed in claim 12, wherein said output section is a printer, and said output control step comprises adjusting image quality of an image to be printed by said printer, based on the image accompanying information.

14. A method as claimed in claim 10, wherein the image accompanying information is indicative of sizes of margins contained in the image data corresponding to the image accompanying information, and said output control step comprises adjusting an output position of an image on a recording medium based on the image accompanying information.

15. A method as claimed in claim 14, wherein said output section is a printer, and said output control step comprises adjusting a printing position of an image on a printing sheet, based on the image accompanying information.

16. A method as claimed in claim 10, wherein the image accompanying information is indicative of an image size before fine adjustment of image size is carried out, and said output control step comprises carrying out at least selection of a recording medium based on the image accompanying information.

17. A method as claimed in claim 10, wherein said input section is a scanner.

18. A method as claimed in claim 10, wherein said transmission step comprises transmitting the image accompanying information using a free area in a header of a TIFF file.

19. An image input/output system in which a plurality of image input/output apparatuses each having input means for inputting image data of original images, and output means for outputting image data are connected together via a communication medium, comprising:
   transmission means for transmitting the image data input by said input means and image accompanying information relating to the input image data including at least a size of the input image data to at least one of said image input/output apparatuses;
   receiving means for receiving image data and image accompanying information relating thereto from at least one of said image input/output apparatuses; and
   output control means for carrying out control so as to output images using said output means based on the image data and the image accompanying information received by said receiving means and selecting a size of a sheet to be output based on the size of the input image data.

* * * * *

UNITED STATES PATENT AND TRADEMARK OFFICE
CERTIFICATE OF CORRECTION

| | |
|---|---|
| PATENT NO. | : 7,414,748 B2 |
| APPLICATION NO. | : 11/369062 |
| DATED | : August 19, 2008 |
| INVENTOR(S) | : Satoshi Kaneko et al. |

It is certified that error appears in the above-identified patent and that said Letters Patent is hereby corrected as shown below:

On the Title page Item (56) Title "References Cited, the Foreign Patent Document section" amend references as follows:

REMOVE: "Foreign Patent Document – 10-65244 A"

INSERT: -- Foreign Patent Document – 10-98577  4/1998 --

Signed and Sealed this

Twenty-first Day of October, 2008

JON W. DUDAS
*Director of the United States Patent and Trademark Office*